United States Patent
Tong

(10) Patent No.: US 6,600,135 B2
(45) Date of Patent: Jul. 29, 2003

(54) METHOD AND APPARATUS FOR CONTROLLING AC PULSE ARC WELDING AND WELDING POWER SOURCE APPARATUS

(75) Inventor: Hongjun Tong, Takatsuki (JP)

(73) Assignee: Daihen Corporation, Osaka (JP)

( * ) Notice: Subject to any disclaimer, the term of this patent is extended or adjusted under 35 U.S.C. 154(b) by 14 days.

(21) Appl. No.: 09/950,850

(22) Filed: Sep. 12, 2001

(65) Prior Publication Data

US 2002/0030043 A1 Mar. 14, 2002

(30) Foreign Application Priority Data

Sep. 12, 2000 (JP) .......................... 2000-277000

(51) Int. Cl.⁷ ................................. B23K 9/09
(52) U.S. Cl. ............................ 219/137 PS; 219/130.51
(58) Field of Search ................... 219/130.51, 130.5, 219/130.31, 130.32, 130.33, 137 PS

(56) References Cited

U.S. PATENT DOCUMENTS 5,349,159 A  * 9/1994  Mita et al. ............. 219/130.51
5,990,445 A  * 11/1999 Ogasawara et al. ..... 219/130.51

FOREIGN PATENT DOCUMENTS

| JP | 64-22471 | 1/1989 |
|---|---|---|
| JP | 1-150469 | 6/1989 |
| JP | 1-186279 | 7/1989 |
| JP | 1-266967 | 10/1989 |
| JP | 2-37974 | 2/1990 |
| JP | 3-52769 | 3/1991 |
| JP | 3-106567 | 5/1991 |
| JP | 3-297560 | 12/1991 |
| JP | 3-297561 | 12/1991 |

OTHER PUBLICATIONS

Maruyama T. et al., ""SENSARC AL350" Penetration–Controllable MIG Welding Power Source for Aluminum Alloy Thin Plates", *Kei–Kinzoku–Yousetsu* (*Light Metal Welding*), 30(5):210–216 (1992).

* cited by examiner

*Primary Examiner*—Clifford C. Shaw
(74) *Attorney, Agent, or Firm*—Scully, Scott Murphy & Presser

(57) ABSTRACT

In a method and an apparatus for controlling AC pulse arc welding executed by supplying a welding current flowing between a welding wire and an object to be welded with feeding the welding wire at a feeding speed corresponding to a predetermined feeding speed setting signal, a one-period process for supplying the welding current is repeatedly executed. The one-period process includes a first process during a peak time interval, a second process during a negative electrode time interval, and a third process during a base time interval. The one-period process further includes a fourth process during a switching current interval, inserted between the peak time interval and the negative electrode time interval, for supplying a welding current having a switching current for stopping growth of droplet which is smaller than a threshold current with a positive electrode polarity.

19 Claims, 14 Drawing Sheets

METHOD AND APPARATUS FOR CONTROLLING AC PULSE ARC WELDING AND WELDING POWER SOURCE APPARATUS

BACKGROUND OF THE INVENTION

1. Field of the Invention

The present invention relates to a method and an apparatus for controlling AC (Alternating Current) pulse arc welding, and a welding power source apparatus, and in particular, to a method and an apparatus for controlling consumable electrode type AC pulse arc welding, and a welding power source apparatus for use in consumable electrode type AC pulse arc welding.

2. Description of the Prior Art

In an AC pulse arc welding method which is executed by supplying a welding current Iw flowing between a welding wire and an object to be welded with feeding the welding wire at a feeding speed, a one-period process for supplying the welding current is repeatedly executed where the one-period process including:

(a) a first process during a peak time interval Tp for supplying a welding current Iw having a peak current Ip for causing droplet transfer, which is larger than a predetermined threshold current (or critical current) and which flows from the welding wire to the object to be welded with a positive electrode polarity;

(b) a second process during a negative electrode time interval Ten for thereafter supplying a welding current Iw having a negative electrode current Ien for stopping droplet transfer which flows from the object to be welded to the welding wire with a negative electrode polarity; and (c) a third process during a base time interval Tb for thereafter supplying a welding current Iw having a base current Ib for stopping droplet transfer which is smaller than the threshold current with a positive electrode polarity.

The above-mentioned AC pulse arc welding method is utilized for welding materials of aluminum and its alloy, stainless steel, steel or the like, and in particular, it is utilized in many cases where the material to be welded is a thin plate having a thickness of several mm or less. The reason for this is as follows. The object to be welded becomes a cathode during the time interval of the positive electrode polarity, and the amount of heat entering into the object to be welded becomes large due to the cathode drop voltage. On the other hand, the object to be welded becomes an anode during the time interval of the negative electrode polarity, and the amount of heat entering into the object to be welded becomes smaller than that in the time interval of the positive electrode polarity since the anode drop voltage is smaller than the cathode drop voltage. In the same manner, since the welding wire becomes the anode during the time interval of the positive electrode polarity, the amount of heat entrance becomes small, and the melting rate of the welding wire becomes smaller. On the other hand, since the welding wire becomes the cathode during the time interval of they negative electrode polarity, the amount of heat entrance becomes large, and the melting rate of the welding wire becomes larger. Accordingly, in the AC pulse arc welding method, the amount of heat entering into the object to be welded and into the welding wire can be adjusted to a desired value by controlling the time ratio of the time interval of the positive electrode polarity to the time interval of the negative electrode polarity, and this leads to that thin plate welding can be acceptably carried out. In the following, an AC pulse arc welding control method and a welding power source apparatus according to a prior art will be described.

FIG. 1 shows an operation of a method for controlling AC pulse arc welding according to a prior art, wherein FIG. 1(A) is a waveform chart showing a welding current Iw, FIG. 1(B) is a waveform chart showing a welding voltage Vw, and FIG. 1(C) is a side view showing a status of droplet transfer in each of four timings. In FIG. 1, EN denotes the negative electrode polarity, and EP represents the positive electrode polarity. In the following, a description is given with reference to FIG. 1.

<1>Time Interval t1 to t2 During Peak Time Interval Tp

As shown in FIG. 1(A), the peak current Ip is made to flow with the positive electrode polarity during the peak time interval Tp. Usually, the values of both the peak time interval Tp and the peak current Ip are set in advance so that droplets from the welding wire 1 is transferred to the object 2 to be welded by one droplet per one pulse by means of arc heat and an electromagnetic pinching force. In addition, as shown in FIG. 1(B), during this time interval, the peak voltage Vp corresponding to the flow of the peak current Ip is applied between the welding wire 1 with the positive electrode polarity and the object 2 to be welded with the negative electrode polarity.

<2>Time Interval t2 to t3 During Negative Electrode Time Interval Ten

At the next timing t2, the positive electrode polarity is switched to the negative electrode polarity, and then, the negative electrode current Ien is made to flow during the negative electrode time interval Ten as shown in FIG. 1(A). Usually, the values of both the negative electrode time interval Ten and the negative electrode current Ien are set in advance to appropriate values, respectively, according to the material quality, plate thickness, shape or the like of the object 2 to be welded, so as not to cause droplet transfer. In addition, as shown in FIG. 1(B), during this time interval, the negative electrode voltage Ven corresponding to the flow of the above negative electrode current Ien is applied between the welding wire 1 with the negative electrode polarity and the object 2 to be welded with the positive electrode polarity.

<3>Time Interval t3 to t4 During Base Time Interval Tb

At the next timing t3, the negative electrode polarity is again switched to the positive electrode polarity, and then, as shown in FIG. 1(A), a base current Ib is made to flow, which is set in advance so as to stop droplet transfer during the base time interval Tb. In addition, during this time interval, a base voltage Vb corresponding to the flow of the base current Ib is applied between the welding wire 1 with the positive electrode polarity and the object 2 to be welded with the negative electrode polarity. The base time interval Tb is automatically set by the following modulation control. Namely, as shown in FIG. 1(B) the timing of completion of the base time interval Tb is controlled by the modulation control so as to be such a timing that an integral value Iv of an error between the welding voltage Vw for the time interval of positive electrode polarity and the preset voltage setting signal Vs becomes 0V, In the case of FIG. 1, the welding voltage Vw for the time interval of the positive electrode plurality includes the peak voltage Vp during the peak time interval Tp, and the base voltage Vb during the, base time interval Tb. Accordingly, the timing of completion of the base time interval Tb which is called a timing t4 is determined according to the following equation so that the sum of (a) the integral value $Iv1 = \int (Vp-$ Vs) dt of the error between the peak voltage value Vp during the peak time interval Tp and the voltage setting signal Vs, and (b) the integral value Iv2=∫(Vb−Vs) dt of the error between the base voltage value Vb during the base time interval Tb and the voltage setting signal Vs becomes 0V.

$$Iv=\int(Vp-Vs)dt+\int(Vb-Vs)dt=0 \quad (1)$$

The above-mentioned modulation control will be described in detail later with reference to FIG. 3. Further, at the timing t4 and thereafter, the AC pulse arc welding is carried out by executing the one-period process including the above three processes <1> to <3> from the timing t1 to the timing t3.

<4>Status of Droplet Transfer During Each Above Time Interval

As shown in FIG. 1(C1), the melting of the welding wire 1 is promoted by the flow of the peak current Ip which has a large value so that the droplet 1a grows large during the peak time interval Tp. At that time, an arc 3 during the positive electrode polarity is generated from the bottom part of the droplet 1a so that the distance between the droplet 1a and the object 2 to be welded becomes the shortest. Next, as shown in FIG. 1(C2), in the latter half of the peak time interval Tp, the pinching force due to the flow of the peak current Ip acts on the droplet 1a so that a narrow part is formed in the upper part of the droplet 1a.

Furthermore, as shown in FIG. 1(C3), at the timing t2 when the peak time interval Tp is completed and the positive electrode polarity is switched to the negative electrode polarity, the droplet 1a comes off from the welding wire 1 so as to transfer to the object 2 to be welded. On the other hand, a part of the droplet 1a which has not come off remains at the tip of the welding wire 1 as a remaining droplet 1b in an unstable form which extends in an elongated manner. In this case, at that timing, the distance between the cathode point and the object 2 to be welded is short and the temperature of the cathode point is high, and therefore, the cathode point is formed in the remaining droplet 1b and further the whole of the remaining droplet 1b is moved at a high speed so that the arc 3 with the negative electrode polarity is generated. Furthermore, as shown in FIG. 1(C4), the droplet 1b gradually grows due to the flow of the negative electrode current Ien during the negative electrode polarity Ten. At that timing, the remaining droplet 1b becomes a droplet in a stable spherical form by means of a surface tension, and the cathode point is formed moving at a high speed over the entirety of the spherical droplet and toward a non-melting part of the lower part of the welding wire 1 so that the arc 3 is generated from the entirety of the droplet 1b and from the lower part of the welding wire 1. As shown in FIG. 1(C1) to FIG. 1(C4), the process consisting of the steps of formation, growth and transfer of the droplet is repeated.

FIG. 2 is block diagram showing a configuration of a welding power source apparatus for implementing the AC pulse arc welding control method according to the prior art. In the following, each circuit block will be described with reference to FIG. 2.

The commercial power source AC is an input power source of the welding power source apparatus, and the commercial power source of three-phase 200/220V is utilized in the usual case. An output control circuit INV is constituted by the following components:

(a) a primary-side rectifying circuit for rectifying an AC voltage from the commercial power source AC;
(b) a smoothing circuit for smoothing a rectified voltage having a ripple outputted from the primary-side rectifying circuit;
(c) an inverter circuit for converting a smoothed DC voltage into a high frequency AC voltage where the inverter circuit including a drive circuit comprised of a plurality of pairs of power transistors; and
(d) a PWM control circuit for use in PWM control of the inverter circuit by using as a control signal a current error amplification signal Ei which will be described later.

A high frequency transformer INT drops the high frequency AC voltage into a voltage value suitable for arc load. Secondary-side rectifiers D2a to D2d rectify the voltage-dropped high frequency AC voltage into a DC voltage. A polarity switching drive circuit DR generates and outputs a negative electrode polarity drive signal Nd having a high level when the negative electrode time interval signal STen having a high level which will be described later is inputted, and generates and outputs a positive electrode polarity drive signal Pd having a high level when the negative electrode time interval signal STen having a low level is inputted. Accordingly, when the negative electrode polarity drive signal Nd having the high level is outputted, the positive electrode polarity drive signal Pd is not outputted, and contrarily, when the negative electrode polarity drive signal Nd having the low level is outputted, the positive electrode polarity drive signal Pd is outputted. Namely, there are relationships thereof that are logically inverted to each other. In this case, a positive electrode polarity transistor PTR is in an ON state when the positive electrode polarity drive signal Pd having the high level is outputted, and then, this leads to the time interval of the positive electrode polarity. On the other hand, a negative electrode polarity transistor NTR is in the ON state when the negative electrode polarity drive signal Nd having the high level is outputted, and then, this leads to the time interval of the negative electrode polarity.

A polarity switching circuit SWP is constituted by the polarity switching drive circuit DR, the positive electrode polarity transistor PTR, and the negative electrode polarity transistor NTR. The polarity switching circuit SWP switches the DC output from the power source apparatus (which is output of the secondary-side rectifier D2a to D2d) to the negative electrode polarity when the negative electrode time interval signal STen having the high level is inputted, and on the other hand, the polarity switching circuit SWP switches the DC output from the power source apparatus to the positive electrode polarity when the negative electrode time interval signal STen having the low level is inputted.

A reactor WL smoothes an output voltage having a ripple which passed through the positive electrode polarity transistor PTR or the negative electrode polarity transistor NTR, and supplies the smoothed output voltage through a welding torch 4 to the arc 3. The peak current Ip and the base current Ib during the time interval of the positive electrode polarity, which is described with reference to FIG. 1, flows through such a path as from D2a or D2b through PTR, WL, and welding wire 1 to the object 2 to be welded. On the other hand, the negative electrode current Ien during the time interval of the negative electrode polarity flows through such a path as from the object 2 to be welded through the welding wire 1, NTR and WL to D2c or D2d.

The welding wire 1 is fed through the welding torch 4 by means of a feeding roll 5a of a wire feeding apparatus at a feeding speed corresponding to a feeding speed setting signal Ws (no shown), and also, the electric power is supplied from the contact tip of the tip of the welding torch 4 so that the arc 3 is generated between the welding wire 1 and the object 2 to be welded.

A peak time interval timer circuit TP is triggered by input of the reset signal Cp having the high level, and then, outputs the peak time interval signal STp which becomes of the high level for a predetermined constant time interval. A negative electrode time interval timer circuit TEN is triggered by output completion or change from the high level to the low level of the peak time interval signal STp, and then, outputs the negative electrode time interval signal STen which becomes of the high level for a predetermined constant time interval.

A voltage detection circuit VD detects the welding voltage Vw, and outputs a voltage detection signal Vd indicating the detected welding voltage Vw. A voltage setting circuit VS generates and outputs a voltage setting signal Vs which becomes a targeted value of the average value of the welding voltage Vw (including the peak voltage Vp and the base voltage Vb which are described above with reference to FIG. 1) during the time interval of the positive electrode polarity. A voltage error circuit EV calculates an error of Vd−Vs, and then, generates and outputs a voltage error signal Ev indicating the error thereof. An integrating circuit IV integrates the voltage error signal Ev when the negative electrode time interval signal STen having the low level is inputted, and then, generates and outputs an integral value signal Iv indicating an integral value thereof. In the above case, the time interval when the negative electrode time interval signal STen having the low level is inputted means the time interval of the positive electrode polarity, and as a result, the integrating circuit IV carries out integration of the following equation:

$$Iv = \int (Vp-Vs)dt = \int (Vp-Vs)dt + \int (Vb-Vs)dt$$

shown in the equation (1). A comparison circuit CP generates and outputs a reset signal Cp which becomes of high level for a short time interval when the above integral value signal Iv becomes equal to 0V. This reset signal Cp is inputted to the peak time interval timer circuit TP, and triggers start of output of the peak time interval signal STp having the high level.

A modulation circuit MC is constituted by the voltage error circuit EV, integrating circuit IV, and comparison circuit CP, and executes the following processing which corresponds to the equation (1). Namely, the modulation circuit MC generates and outputs the reset signal Cp which triggers restart of output of the peak time interval timer circuit TP when the integral value Iv of the error between the voltage detection signal Vd and the voltage setting signal Vs for the time interval of the positive electrode polarity from the timing of start of output of the peak time interval signal STp becomes 0V.

A peak current setting circuit IP generates and outputs a peak current setting signal SIp indicating a predetermined peak current Ip for causing droplet transfer which is larger than a predetermined threshold current. The negative electrode current setting circuit IEN generates and outputs a negative electrode current setting signal SIen indicating a negative electrode current Ien for stopping droplet transfer. A base current setting circuit IB generates and outputs a base current setting signal SIb indicating a base current Ib for stopping droplet transfer which is smaller than the threshold current. A peak time interval switching circuit SP is switched over to a contact "a" thereof when the peak time interval signal STp having the high level is inputted, so as to output the peak current setting signal SIp as a current control setting signal Isc. On the other hand, the peak time interval switching circuit SP is switched to a contact "b" when the peak time interval signal STp having the low level is inputted, so as to output a switching setting signal Se, which will be described later, as the current control setting signal Isc. A negative electrode time interval switching circuit SE is switched to a contact "a" when the negative electrode time interval signal STen having the high level is inputted, so as to output the negative electrode current setting signal SIen as the switching setting signal Se. On the other hand, the negative electrode time interval switching circuit SE is switched to a contact "b" when the negative electrode time interval signal STen having the low level is inputted, so as to output the base current setting signal SIb as the switching setting signal Se.

A current control setting circuit ISC-p is constituted by the peak time interval switching circuit SP and negative electrode time interval switching circuit Se, and the processing thereof is as follows. Namely, the current control setting circuit ISC-p outputs the peak current setting signal SIp as the current control setting signal Isc when the peak time interval signal STp having the high level is inputted, outputs the negative electrode current setting signal SIen as the current control setting signal Isc when the negative electrode time interval signal STen having the high level is inputted, and outputs the base current setting signal SIb as the current control setting signal Isc when neither of the interval signals STp and STen each having the high level are inputted.

A current detection circuit ID detects the AC welding current Iw, and then, outputs a current detection signal Id which is obtained by converting the value of the welding current Iw into an absolute value thereof. A current error amplification circuit EI amplifies the error between the current detection signal Id and current control setting signal Isc, and then, outputs the current error amplification signal Ei indicating an amplified error. The output control circuit INV controls the welding current Iw in accordance with the current error amplification signal Ei. Therefore, the peak current Ip flows in the case of Isc=Ip, the negative electrode current Ien flows in the case of Isc=Ien, and the base current Ib flows in the case of Isc=Ib.

FIG. 3 is a timing chart of each signal generated in the welding power source apparatus according to the prior art, wherein FIG. 3(A) shows a welding current Iw, FIG. 3(B) shows a welding voltage Vw, FIG. 3(C) shows a peak time interval signal STp, FIG. 3(D) shows a negative electrode time interval signal STen, FIG. 3(E) shows an integral value signal Iv, and FIG. 3(F) shows a reset signal Cp. It is to be noted that FIGS. 3(A) and 3(B) are the same as FIGS. 1(A) and 1(B), respectively. The operation of the welding power source apparatus will be described hereinafter with reference to FIG. 3.

<1>Timing t1 to t2 During Peak Time Interval Tp

For the time interval from the timing t1 to t2 during the peak time interval Tp, the negative electrode time interval signal STen shown in FIG. 3(D) is not outputted, namely, the negative electrode time interval signal STen having the low level is outputted. Therefore, this time interval becomes in the positive electrode polarity. In addition, when the peak time interval signal STp having the high level is outputted as shown in FIG. 3(C), the peak current Ip flows as shown in FIG. 3(A). Furthermore, the integral value signal Iv shown in FIG. 3(E) has an integral value of: $Iv = \int (Vp-Vs) dt$ in response to the peak voltage Vp and the voltage setting signal Vs shown in FIG. 3(B). At this timing, this integral value gradually becomes larger as the time elapses because of Vp>Vs.

<2>Timing t2 to t3 During Negative Electrode Time Interval Ten

For the time interval from the timing t2 to t3 during the negative electrode time interval Ten, the negative electrode time interval signal STen having the high level shown in FIG. 3(D) is outputted, and therefore, this time interval becomes in the negative electrode polarity, and the negative electrode current Ien flows as shown in FIG. 3(A). In addition, as shown in FIG. 3(E), the integration processing is stopped since the negative electrode time interval signal STen having the high level is not outputted, namely, the negative electrode time interval signal STen having the low level is outputted. Therefore, the integral value signal Iv does not change during this time interval.

<3> Timing t3 to t4 During Time Interval Tb

For the time interval from the timing t3 to t4 during the time interval Tb, the negative electrode time interval signal STen having the high level shown in FIG. 3(D) is not outputted, namely, the negative electrode time interval signal STen having the low level is outputted. Therefore, this time interval becomes in the positive electrode polarity. In addition, during this time interval, neither the peak time interval signal STp shown in FIG. 3(C) nor the negative electrode time interval signal STen shown in FIG. 3(D) are outputted, namely, the peak time interval signal STp having the low level and the negative electrode time interval signal STen having the low level are outputted. Therefore, the base current Ib flows as shown in FIG. 3(A). Furthermore, the integral value signal Iv shown in FIG. 3(E) has an integral value of: $Iv=\int(Vb-Vs)\,dt$ in response to the base voltage Vb and the voltage setting signal Vs shown in FIG. 3(B). In this case, this integral value gradually becomes smaller as the time elapses because of Vb<Vs, and becomes 0V at the timing t4. When the integral value signal Iv becomes 0V, the reset signal CP has the high level for a short time interval as shown in FIG. 3(F), and as a result, the output of the peak time interval signal STp shown in the above-mentioned time interval <1> is restarted.

FIG. 4 shows an operation of droplet transfer upon switching electrode polarity for explanation of problems in the prior art to be solved, wherein FIG. 4(A) is a timing chart of a welding current Iw upon switching electrode polarity from a positive value to a negative value before and after a timing t2, and FIG. 4(B) is a side view showing a status of droplet transfer in each of three timings.

Immediately before the timing of polarity switching at the timing t2 as shown in FIG. 4(A), the droplet 1a formed at the tip of the welding wire 1 has grown to a large size as shown in FIG. 4(B1) by means of the flow of the peak current Ip during the peak time interval Tp, and a narrow part is formed in the upper part of the droplet 1a by means of the pinching force due to the flow of the peak current Ip. Next, in the negative electrode polarity at the timing t1 as shown in FIG. 4(A), the major part of the droplet 1a comes off, and drops and transfers to the object 2 to be welded as shown in FIG. 4(B2). In this case, a part of the droplet 1a which has not come off remains at the tip of the welding wire 1 in an unstable form, extending in an elongated manner as a remaining droplet 1b. This remaining droplet 1b is transferred into a spherical stable form due to surface tension with the elapse of time. However, until the time when the form of the remaining droplet 1b is transferred into the stable form, the cathode point N1 is formed moving at a high speed over the entirety of the remaining droplet 1b, which is in an unstable form, since the distance between the cathode point N1 and the object 2 to be welded is short and the cathode point N1 is at a high temperature. In the place where this cathode point N1 is formed, the temperature rises dramatically because of the local heating due to the cathode drop voltage, and an evaporation phenomenon is caused. Expulsion and spatters including surface flash 1c (generally called expulsion) are scattered from the remaining droplet 1b, which extends in an elongated form, because of the repulsion accompanying with the above evaporation phenomenon. The scattering of this expulsion 1c occurs at every place which the cathode point N1 is moved to, and as shown in FIG. 4(B3), occurs until the remaining droplet 1b has converted to a stable form.

As described above, accompanying with the droplet transfer at the time of polarity switching, a large amount of expulsion is scattered and adheres to the welding bead of the object 2 to be welded according to the prior art, and therefore, there is such a problem to be solved that the external surface of the bead becomes defective. A concrete example of this defective external surface of the bead will be described hereinafter.

FIG. 5 is a schematic view showing an appearance of a bead in the case of welding using a method for controlling AC pulse arc welding according to the prior art which is described with reference to FIG. 1. FIG. 5 shows a case of welding where a plate of aluminum alloy A5052 having a plate thickness of 4 mm is utilized as an object 2 to be welded, and a welding wire of type A5356 having a diameter of 1.2 mm is utilized. In addition, the other welding conditions are as follows:

(a) Average welding current=150A;

(b) Average welding voltage=19V;

(c) Peak current Ip=350A;

(d) Peak time interval Tp=1.0 millisecond;

(e) Base current Ib=75A;

(f) Negative electrode current Ien=100A; and (g) Negative electrode time interval Ten=2 milliseconds.

As shown in FIG. 5, a large amount of expulsion 1c, which has occurred due to the reasons described above with reference to FIG. 4, was attached to the periphery of the welding bead 2a formed in the object 2 to be welded, and this led to an appearance of defective bead.

SUMMARY OF THE INVENTION

An essential object of the present invention is therefore to provide a method and an apparatus for controlling AC pulse arc welding and a welding power source apparatus, capable of obtaining an appearance of excellent bead by preventing generation of a large amount of expulsion, which occurs due to droplet transfer at the time of polarity switching.

In order to achieve the aforementioned objective, according to one aspect of the present invention, there is provided a method for controlling AC pulse arc welding executed by supplying a welding current flowing between a welding wire and an object to be welded with feeding the welding wire at a feeding speed corresponding to a predetermined feeding speed setting signal, the method including a step of repeatedly executing a one-period process for supplying the welding current, the one-period process including:

(a) a first process during a peak time interval for supplying a welding current having a peak current for droplet transfer, which is larger than a predetermined threshold current and which flows from the welding wire to the object to be welded with a positive electrode polarity;

(b) a second process during a negative electrode time interval for thereafter supplying a welding current having a negative electrode current for stopping droplet transfer which flows from the object to be welded to the welding wire with a negative electrode polarity; and (c) a third process during a base time interval for thereafter supplying a welding current having a base current for stopping droplet transfer which is smaller than the threshold current with a positive electrode polarity, wherein the one-period process further includes a fourth process during a predetermined switching current interval, inserted between the peak time interval and the negative electrode time interval, for supplying a welding current having a switching current for stopping growth of droplet which is smaller than the threshold current with a positive electrode polarity.

In the above-mentioned method, the switching current is preferably set so as to be larger than a current value at which cut of arc is caused.

In the above-mentioned method, in the fourth process during the switching current interval, either one of the switching current, a time of the switching current interval, and both of the switching current and the time of the switching current interval is preferably changed in accordance with the feeding speed setting signal.

In the above-mentioned method, the time of switching current interval is preferably set so as to be fallen in a range from 0.3 milliseconds to 3 milliseconds.

In the above-mentioned method, the first process during the peak time interval preferably further includes a step of supplying the welding current which increases to the peak current with time. Alternatively, the first process during the peak time interval preferably further includes a step of supplying the welding current which decreases from the peak current with time. Further alternatively, the first process during the peak time interval preferably further includes the steps of:

(a) supplying the welding current which increases to the peak current with time; and (b) supplying the welding current which decreases from the peak current with time In the above-mentioned method, the fourth process during the switching current interval preferably further includes a step of increasing the switching current with time.

According to another aspect of the present invention, there is provided an apparatus for controlling AC pulse arc welding executed by supplying a welding current flowing between a welding wire and an object to be welded with feeding the welding wire at a feeding speed corresponding to a predetermined feeding speed setting signal, the apparatus comprising controller means for repeatedly executing a one-period process for supplying the welding current, the one-period process including:

(a) a first process during a peak time interval for supplying a welding current having a peak current for droplet transfer, which is larger than a predetermined threshold current and which flows from the welding wire to the object to be welded with a positive electrode polarity;

(b) a second process during a negative electrode time interval for thereafter supplying a welding current having a negative electrode current for stopping droplet transfer which flows from the object to be welded to the welding wire with a negative electrode polarity; and (c) a third process during a base time interval for thereafter supplying a welding current having a base current for stopping droplet transfer which is smaller than the threshold current with a positive electrode polarity, wherein the one-period process further includes a fourth process during a predetermined switching current interval, inserted between the peak time interval and the negative electrode time interval, for supplying a welding current having a switching current for stopping growth of droplet which is smaller than the threshold current with a positive electrode polarity.

In the above-mentioned apparatus, the switching current is preferably set so as to be larger than a current value at which cut of arc is caused.

In the above-mentioned apparatus, in the fourth process during the switching current interval, either one of the switching current, a time of the switching current interval, and both of the switching current and the time of the switching current interval is preferably changed in accordance with the feeding speed setting signal.

In the above-mentioned apparatus, the time of switching current interval is preferably set so as to be fallen in a range from 0.3 milliseconds to 3 milliseconds.

In the above-mentioned apparatus, the first process during the peak time interval preferably further includes a step of supplying the welding current which increases to the peak current with time. Alternatively, the first process during the peak time interval preferably further includes a step of supplying the welding current which decreases from the peak current with time. Further alternatively, the first process during the peak time interval preferably further includes the steps of:

(a) supplying the welding current which increases to the peak current with time; and (b) supplying the welding current which gradually decreases from the peak current with time.

In the above-mentioned method, the fourth process during the switching current interval preferably further includes a step of increasing the switching current with time.

According to a further aspect of the present invention, there is provided an AC pulse arc welding power source apparatus for use in executing AC pulse arc welding by supplying a welding current flowing between a welding wire and an object to be welded with feeding the welding wire at a feeding speed corresponding to a predetermined feeding speed setting signal, the apparatus comprising:

a peak time interval timer circuit for generating and outputting a peak time interval signal indicating a predetermined peak time interval;

a switching current interval timer circuit for generating and outputting a switching current interval signal indicating a predetermined switching current interval in response to output completion of the peak time interval signal;

a negative electrode time interval timer circuit for generating and outputting a negative electrode time interval signal indicating a negative electrode time interval in response to output completion of the switching current interval signal;

a voltage detection circuit for detecting an AC welding voltage applied between the welding wire and the object to be welded, and for generating and outputting a voltage detection signal indicating a detected AC welding voltage;

a voltage setting circuit for generating and outputting a voltage setting signal indicating a predetermined set voltage;

a modulation circuit for calculating an integral value of an error between the voltage setting signal and the voltage detection signal when the AC welding voltage is larger than zero from a start timing of output of the peak time interval signal, and for generating and outputting a reset signal for triggering restart of output of the peak time interval timer circuit when a calculated integral value becomes zero;

a peak current setting circuit for generating and outputting a peak current setting signal indicating a predetermined peak current for droplet transfer;

a switching current setting circuit for generating and outputting a switching current setting signal indicating a predetermined switching current for stopping growth of droplet;

a negative electrode current setting circuit for generating and outputting a negative electrode current setting signal indicating a predetermined negative electrode current for stopping droplet transfer;

a base current setting circuit for generating and outputting a base current setting signal indicating a predetermined base current for stopping droplet transfer;

a current control setting circuit for outputting the peak current setting signal as the current control setting signal when the peak time interval signal is inputted, for outputting the switching current setting signal as the current control setting signal when the switching current interval signal is inputted, for outputting the negative electrode current setting signal as the current control setting signal when the negative electrode time interval signal is inputted, and for outputting the base current setting signal as the current control setting signal when none of the three interval signals is inputted;

a polarity switching circuit for switching a DC output from the power source apparatus so as to have a negative electrode polarity when the negative electrode time interval signal is inputted, and for switching the DC output from the power source apparatus so as to have a positive electrode polarity when no signal is inputted;

a current detection circuit for detecting a AC welding current, for calculating an absolute value of a detected AC welding current, and for generating and outputting a current detection signal indicating a calculated absolute value thereof; and an output control circuit for controlling the welding current so that the current control setting signal and the current detection signal become equal to each other.

In the above-mentioned apparatus, the switching current setting circuit preferably changes the switching current of the switching current setting signal in accordance with the feeding speed setting signal, and wherein the switching current interval timer circuit changes a time of the switching current interval of the switching current interval signal in accordance with the feeding speed setting signal.

In the above-mentioned apparatus, the switching current interval timer circuit preferably outputs the switching current interval signal having a time of the switching current interval which is ranged from 0.3 milliseconds to 3 milliseconds.

In the above-mentioned apparatus, the peak current setting circuit preferably generates and outputs the peak current setting signal with changing the peak current setting signal so as to supply the welding current which increases from the base current to the peak current with time for a first time interval, to thereafter supply the welding current having the peak current for a second time interval, and to thereafter supply the welding current which decreases from the peak current to the base current with time for a third time interval.

In the above-mentioned apparatus, the switching current setting circuit preferably increases the switching current of the switching current setting signal with time.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 shows an operation of a method for controlling AC pulse arc welding according to a prior art, wherein FIG. 1(A) is a waveform chart showing a welding current Iw, FIG. 1(B) is a waveform chart showing a welding voltage Vw, and FIG. 1(C) is a side view showing a status of droplet transfer in each of four timings;

FIG. 3 is a timing chart of each signal generated in the welding power source apparatus according to the prior art, wherein FIG. 3(A) shows a welding current Iw, FIG. 3(B) shows a welding voltage Vw, FIG. 3(C) shows a peak time interval signal STp, FIG. 3(D) shows a negative electrode time interval signal STen, FIG. 3(E) shows an integral value signal Iv, and FIG. 3(F) shows a reset signal Cp;

FIG. 4 shows an operation of droplet transfer upon switching electrode polarity for explanation of problems in the prior art to be solved, wherein FIG. 4(A) is a timing chart of a welding current Iw upon switching electrode polarity from a positive value to a negative value before and after a timing t2, and FIG. 4(B) is a side view showing a status of droplet transfer in each of three timings;

FIG. 6 is a timing chart of signals showing an operation of a method for controlling AC pulse arc welding according to a first preferred embodiment of the present invention, wherein FIG. 6(A) shows a welding current Iw, and FIG. 6(B) shows a welding voltage Vw;

FIG. 7 shows an operation of droplet transfer upon switching electrode polarity for explanation of an action of a switching current interval Tc according to the first preferred embodiment, wherein FIG. 7(A) is a timing chart of a welding current Iw upon switching electrode polarity from a positive value to a negative value before and after a timing t2, and FIG. 7(B) is a side view showing a status of droplet transfer in each of four timings;

FIG. 9 is a timing chart of each signal generated in the welding power source apparatus according to the first preferred embodiment, wherein FIG. 9(A) shows a welding current Iw, FIG. 9(B) shows a welding voltage Vw, FIG. 9(C) shows a peak time interval signal STp, FIG. 9(D) shows a switching current interval signal STc, FIG. 9(E) shows a negative electrode time interval signal STen, FIG. 9(F) shows an integral value signal Iv, and FIG. 9(G) shows a reset signal Cp;

FIG. 12 is a timing chart of signals showing an operation of a method for controlling AC pulse arc welding according to a fourth preferred embodiment of the present invention, wherein FIG. 12(A) shows a welding current Iw, and FIG. 12(B) shows a welding voltage Vw;

FIG. 15 is a timing chart of signals showing an operation of a method for controlling AC pulse arc welding according to a modified first preferred embodiment of the present invention, wherein FIG. 15(A) shows a welding current Iw, and FIG. 15(B) shows a welding voltage Vw; and FIG. 16 is a timing chart of signals showing an operation of a method for controlling AC pulse arc welding according to a modified fourth preferred embodiment of the present invention, wherein FIG. 16(A) shows a welding current Iw, and FIG. 16(B) shows a welding voltage Vw.

DETAILED DESCRIPTION OF THE PREFERRED EMBODIMENTS

Preferred embodiments according to the present invention will be described below with reference to the attached drawings.

First Preferred Embodiment

Figure 1:
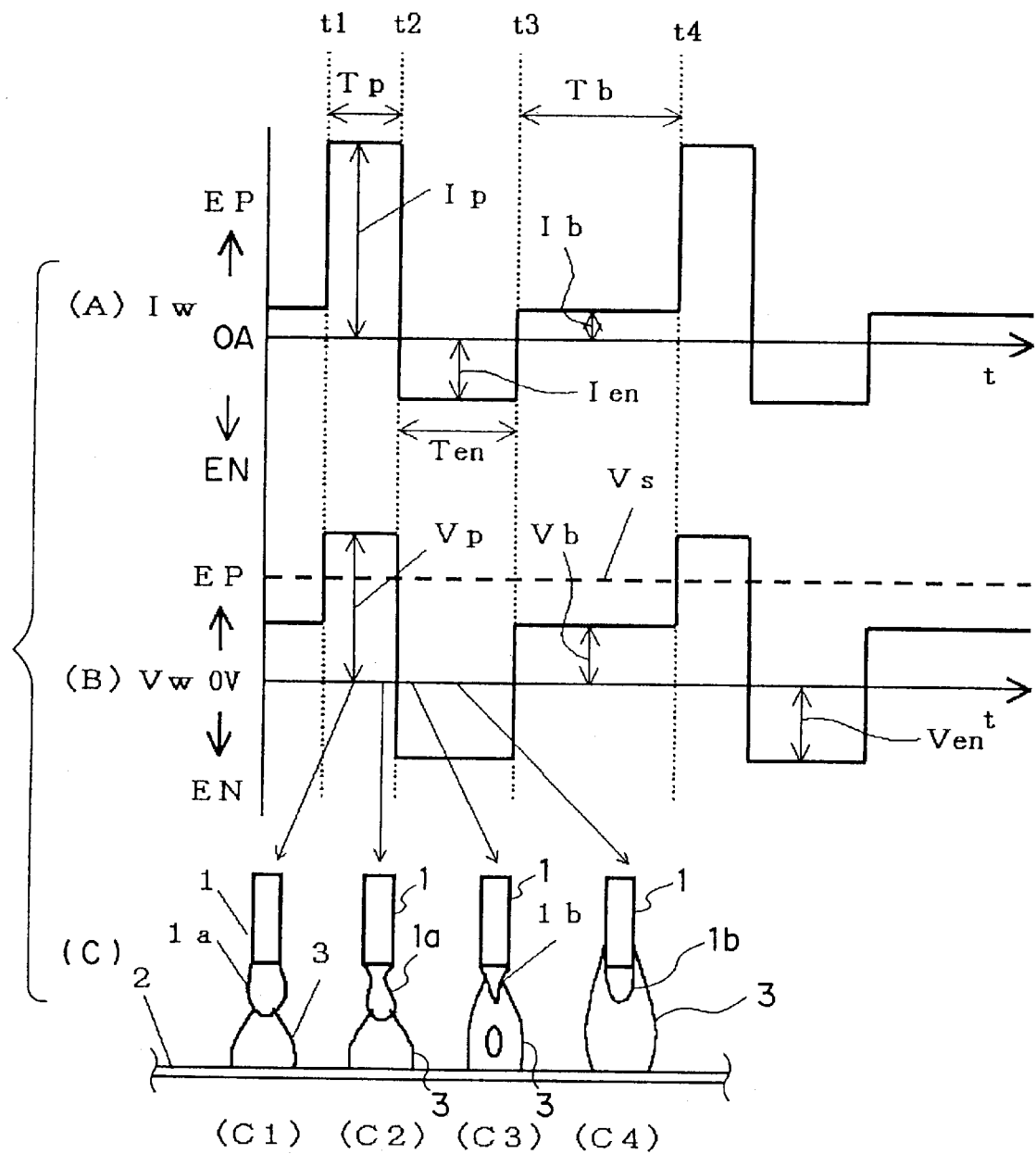
Figure 2:
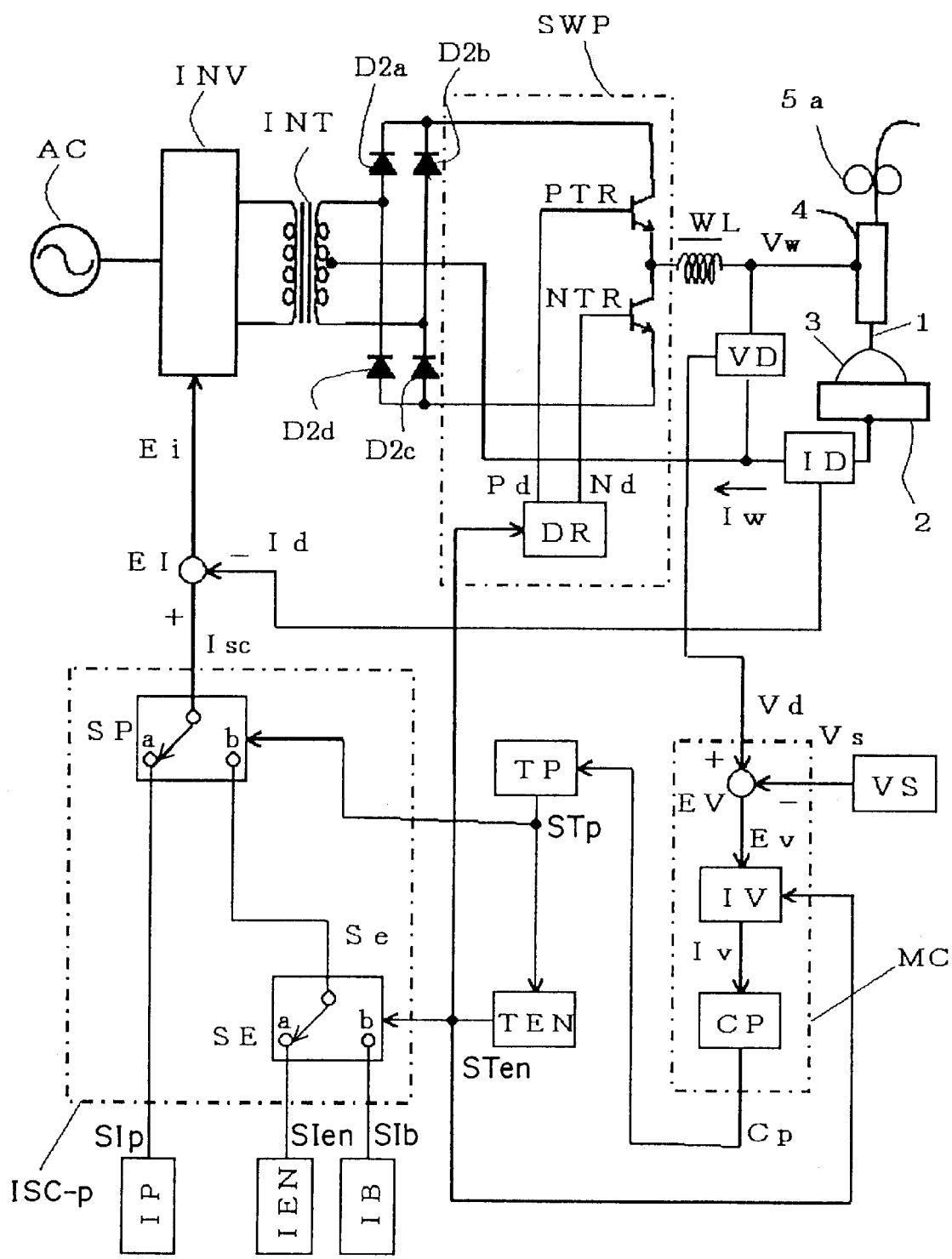
FIG. 2 is a block diagram showing a configuration of a welding power source apparatus according to a prior art.
Figure 6:
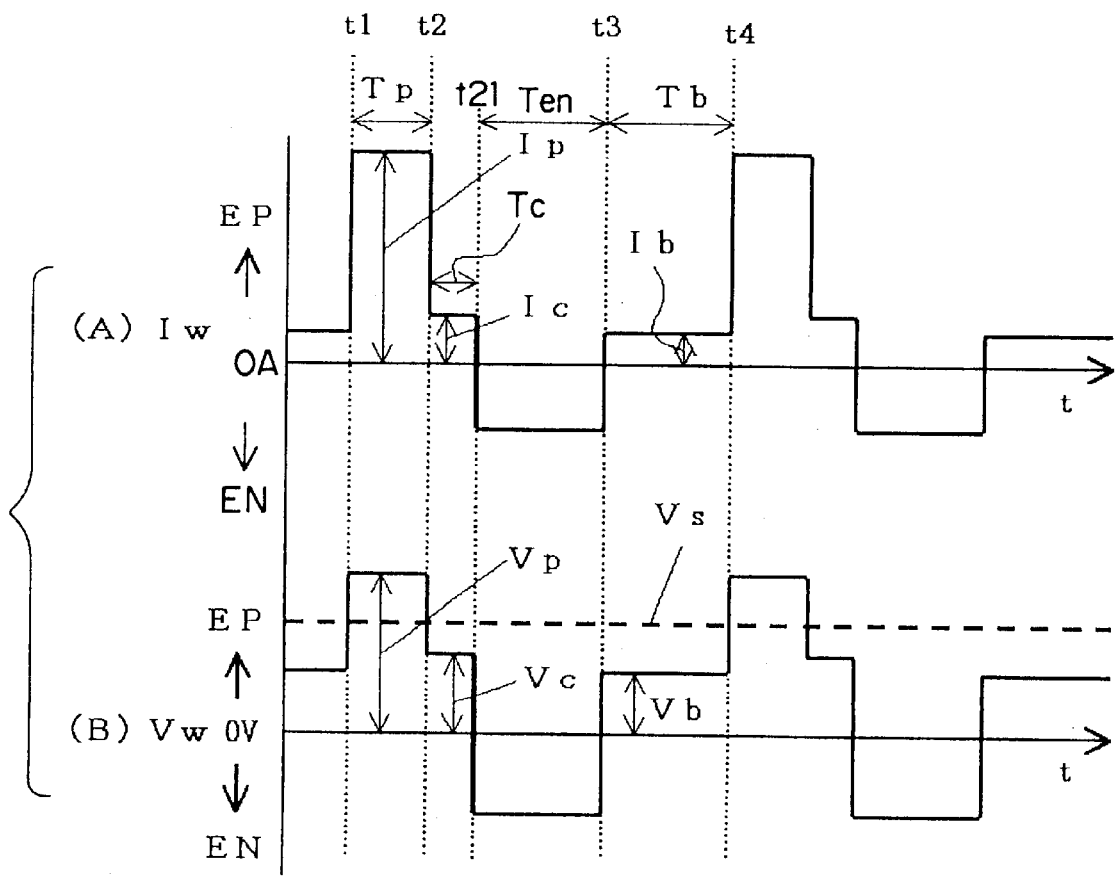
Figure 7:
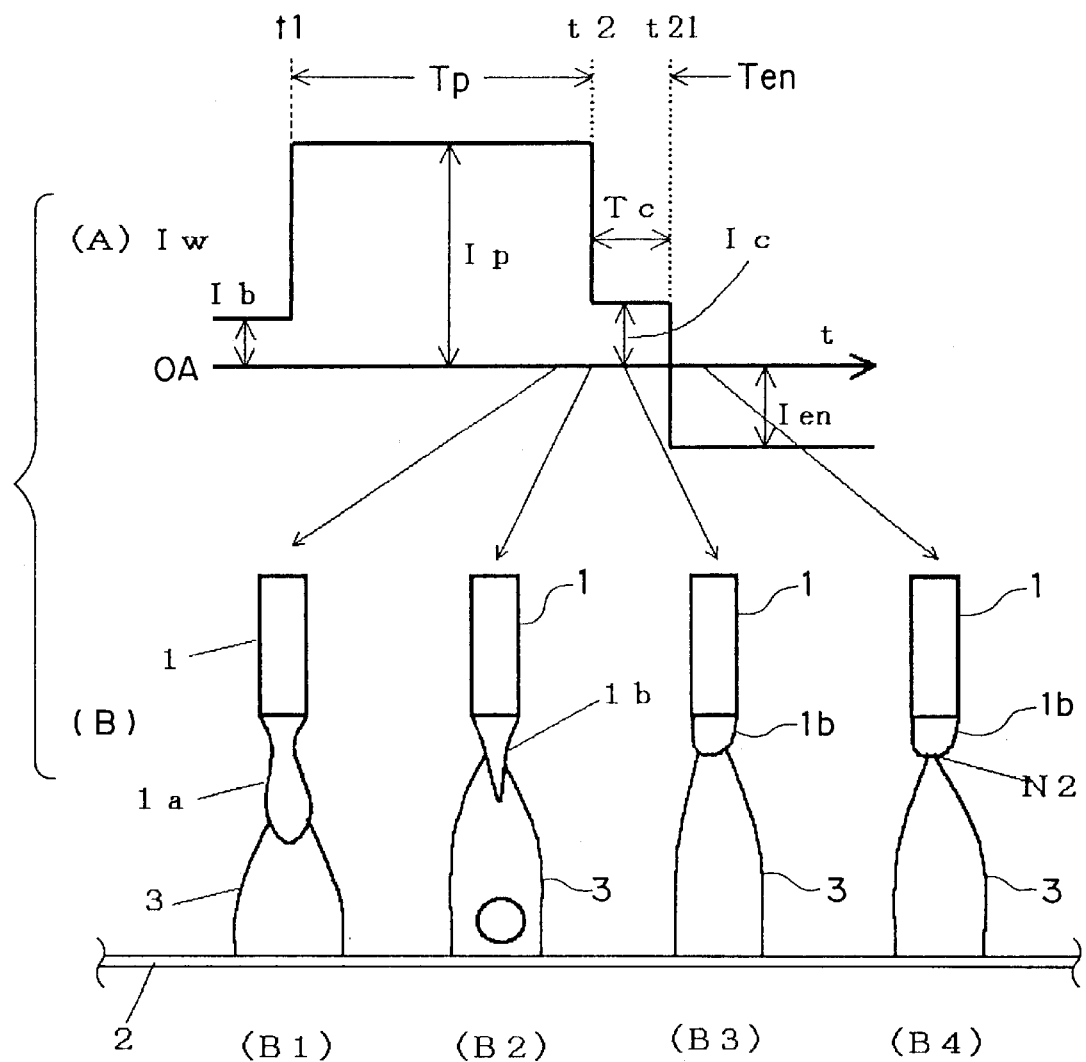
Figure 8:
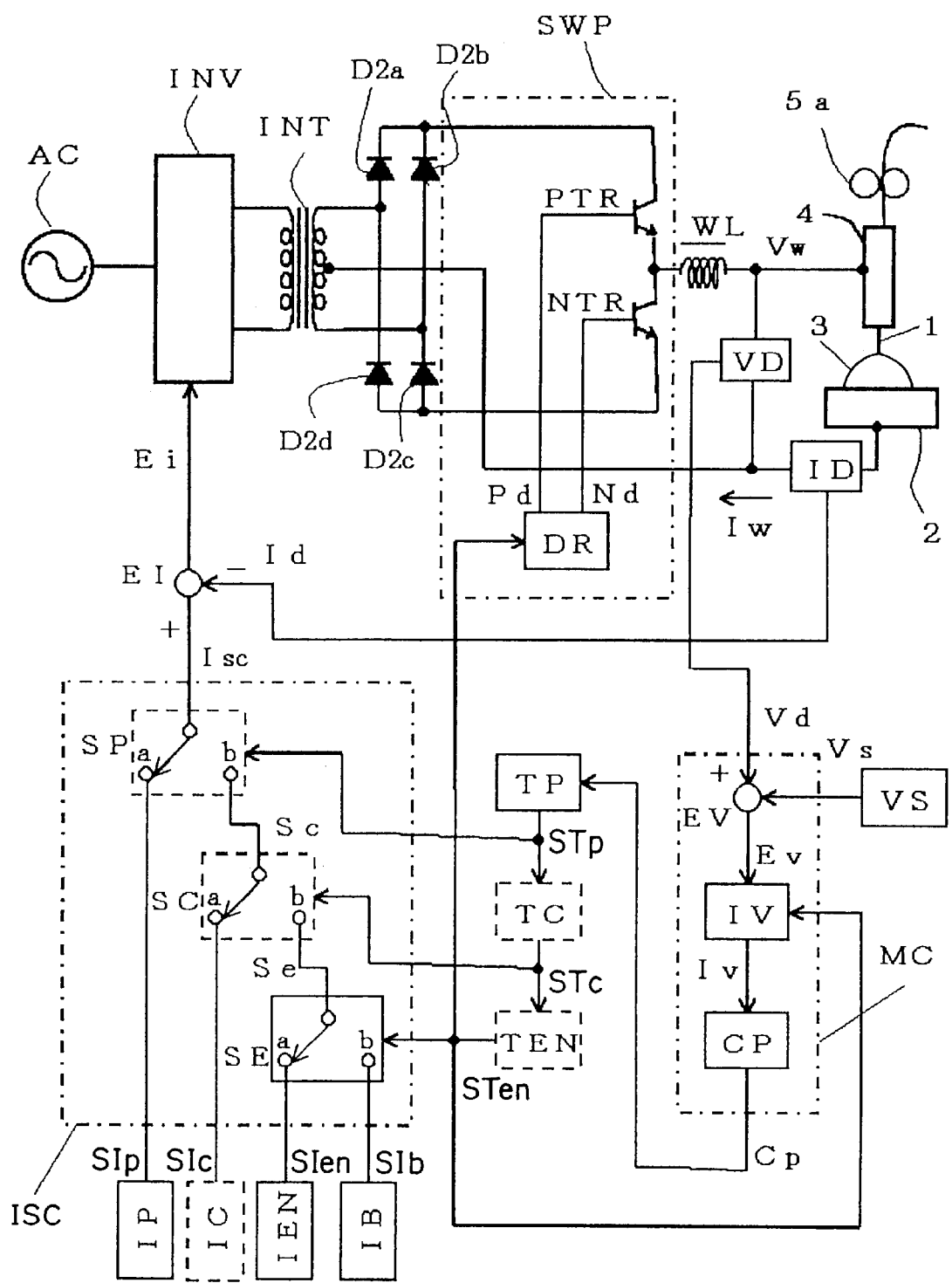
FIG. 8 is a block diagram showing a configuration of a welding power source apparatus according to the first preferred embodiment.

FIG. 6 is a timing chart of signals showing an operation of a method for controlling AC pulse arc welding according to a first preferred embodiment of the present invention. FIG. 7 shows an operation of droplet transfer upon switching electrode polarity for explanation of an action of a switching current interval Tc according to the first preferred embodiment. FIG. 8 is a block diagram showing a configuration of a welding power source apparatus according to the first preferred embodiment. In FIGS. 6 to 8, the same components as those shown in FIGS. 1 and 2 are designated by the same numeral references.

In a method and an apparatus for controlling AC pulse arc welding according to the first preferred embodiment of the present invention, the AC pulse arc welding is executed by supplying a welding current Iw flowing between a welding wire 1 and an object 2 to be welded with feeding the welding wire 1 at a feeding speed corresponding to a predetermined feeding speed setting signal Ws, a one-period process for supplying the welding current is repeatedly executed, where the one-period process includes a first process during a peak time interval Tp, a second process during a negative electrode time interval Ten, and a third process during a base time interval Tb. In particular, the first preferred embodiment is characterized in that, as shown in FIGS. 6 and 7, the one-period process further includes a fourth process during a switching current interval Tc, inserted between the peak time interval Tp and the negative electrode time interval Ten, for supplying a welding current Iw having a switching current Ic for stopping growth of droplet 1a which is smaller than a threshold current with a positive electrode polarity. Further, as apparent from comparison between FIGS. 2 and 8, the welding power source apparatus according to the first preferred embodiment characterized in further comprising the following components:

(a) a switching current interval timer circuit TC for generating and outputting a switching current interval signal STc which is triggered by completion of output of the peak time interval signal STp, where the switching current interval signal STc indicates a predetermined time of the switching current time interval Tc which is preferably set so as to be ranged from 0.3 millisecond to 3 millisecond;

(b) a switching current setting circuit IC for generating and outputting a switching current setting signal SIc indicating a switching current Ic for stopping growth of droplet which is smaller than the threshold current with a positive electrode polarity; and (c) a current control setting circuit ISC of the first preferred embodiment further including a switching current interval switching circuit SC for outputting the switching current setting signal SIc as the current control setting signal Isc when the switching current interval signal STc having the high level is inputted.

The first preferred embodiment will be described in detail hereinafter.

FIG. 6 is a timing chart of signals showing an operation of a method for controlling AC pulse arc welding according to the first preferred embodiment of the present invention, wherein FIG. 6(A) shows a welding current Iw, and FIG. 6(B) shows a welding voltage Vw.

<1>Time Interval t1 to t2 During Peak Time Interval Tp

The operation for the time interval t1 to t2 during the peak time interval Tp is the same as that of FIG. 1, and therefore, the description thereof is omitted.

<2>Time Interval t2 to t21 During Switching Current Interval Tc

The time interval t2 to t21 during the switching current interval Tc is inserted in the first preferred embodiment of the present invention. As shown in FIG. 6(A), when the peak time interval Tp is completed at the timing t2, the predetermined switching current Ic is made to flow in the positive electrode polarity during the switching current interval Tc, where the switching current Ic is set so as to stop growth of droplet which is smaller than the threshold current. In addition, as shown in FIG. 6(B), the switching voltage Vc corresponding to the switching current Ic is applied between the welding wire 1 with the positive electrode polarity and the object 2 to be welded during the switching current interval Tc. In this time interval Tc, an unstable form of the remaining droplet immediately after the droplet transfer is converted into a stable form of spherical form. The operation for this time interval Tc will be described later in detail in a section for describing the same with reference to FIG. 7.

<3>Time Interval t21 to t3 During Negative Electrode Time Interval Ten

The operation for the time interval t21 to t3 during the negative electrode time interval Ten is the same as that shown in FIG. 1, and therefore, the description thereof is omitted.

<4>Time Interval t3 to t4 During Base Time Interval Tb

At the timing t3, when the positive electrode polarity is again set, the base current Ib is made to flow during the base time interval Tb in the same manner as that shown in FIG. 1, as shown in FIG. 6(A). In addition, during this base time interval Tb, a base voltage Vb corresponding to the flow of the base current Ib is applied between the welding wire 1 with the positive polarity and the object 2 to be welded with the negative polarity. As shown in FIG. 6(B), the timing of the completion of this base time interval Tb is, in the same manner as in the prior art described above with reference to FIG. 1, controlled as the timing when the integral value Iv of the error between the welding voltage Vw and a predetermined voltage setting signal Vs for the time of the positive electrode polarity becomes 0V. In the case of FIG. 6, the welding voltage Vw for the time of the positive electrode polarity includes the peak voltage Vp during the peak time interval Tp, the switching voltage Vc during the switching current interval Tc, and the base voltage Vb during the base time interval Tb. Accordingly, the timing of completion of the base time interval Tb, namely, the timing t4 is determined according to the following equation, so that the sum of (a) an integral value $Iv1=\int(Vp-Vs)\,dt$ of the error between the peak voltage value Vp during the peak time interval Tp and the above voltage setting signal Vs, (b) an integral value Iv2=∫(Vc−Vs) dt of the error between the switching voltage value Vc during the switching current interval Tc and the above voltage setting signal Vs, and (c) an integral value Iv3=∫(Vb−Vs) dt of the error between the base voltage value Vb during the base time interval Tb and the above voltage setting signal Vs becomes 0V.

$$Iv=\int(Vp-Vs)dt+\int(Vc-Vs)dt+\int(Vb-Vs)dt=0 \quad (2)$$

In this case, the length of time of the base time interval Tb shown in FIG. 6 becomes shorter than that of the base time interval Tb shown in FIG. 1 because of addition of the switching current interval Tc. This operation will be described later with reference to FIG. 9.

FIG. 7 shows an operation of droplet transfer upon switching electrode polarity for explanation of an action of a switching current interval Tc according to the first preferred embodiment, wherein FIG. 7(A) is a timing chart of a welding current Iw upon switching electrode polarity from a positive value to a negative value before and after a timing t2, and FIG. 7(B) is a side view showing a status of droplet transfer in each of four timings. FIG. 7 corresponds to FIG. 4, and a description is given hereinafter with reference to FIG. 7.

Figure 4:
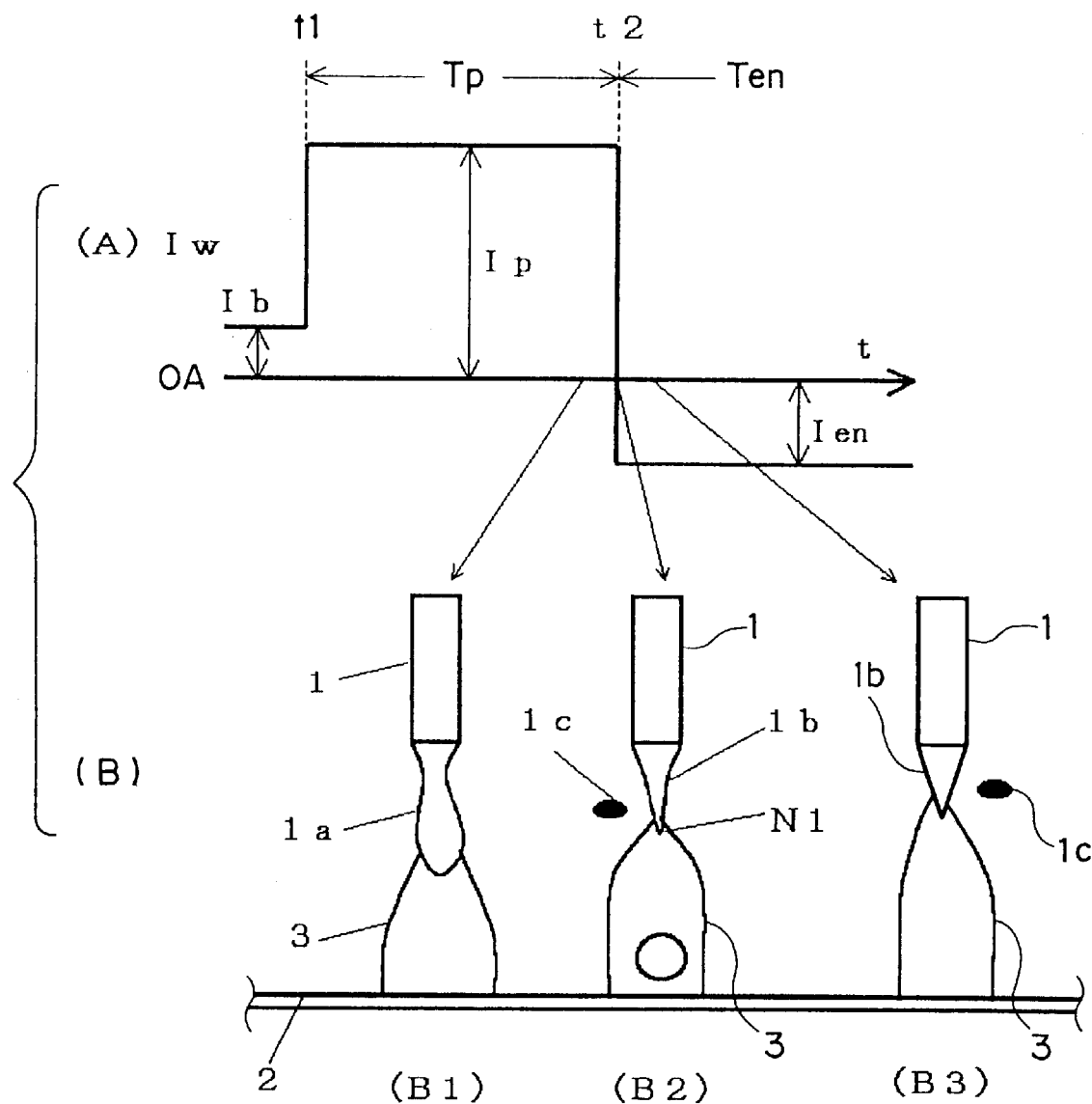

As shown in FIG. 7(A), immediately before the timing t2 which is the timing of completion of the peak time interval Tp, in the same manner as that of FIG. 4, the droplet 1a formed at the tip of the welding wire 1 has grown to a large size, and a narrow part is formed in the upper part of the droplet 1a because of a pinching force due to the flow of the peak current Ip, as shown in FIG. 7(B1), by means of the flow of the peak current Ip during the peak time interval Tp. Next, when the peak time interval Tp is completed at the timing t2, as shown in FIG. 7(A), the major part of the droplet 1a comes off and drops and is transferred to the object 2 to be welded as shown in FIG. 7(B2). At that time, the part of the droplet 1a which has not come off remains at the tip of the welding wire 1 as a remaining droplet 1b in an unstable form extending in an elongated manner. Thereafter, as shown in FIG. 7(B3), the switching current Ic of a small current value is made to flow so that the droplet 1a does not grow with the same positive electrode polarity during the switching current interval Tc of timing t2 to timing t2l, and therefore, the remaining droplet 1b becomes the positive electrode which is not locally heated through formation of cathode point, and is converted into a spherical stable form due to a surface tension as the time elapses. Then, at the t2l which is the timing of completion of the switching current interval Tc, the above remaining droplet 1b has been converted into a stable form. When the positive electrode polarity is switched to the negative electrode polarity in this status, as shown in FIG. 7(B4), though the cathode point N2 is formed in the remaining droplet 1b so that a repulsion accompanying a vapor phenomenon due to the local heating acts on the remaining droplet 1b, however, this repulsion hardly generates almost expulsion because the remaining droplet 1c is in a stable spherical form.

As described above, according to the first preferred embodiment of the present invention, the switching current interval Tc is provided for which the remaining droplet 1b in an unstable form accompanying the droplet transfer at the timing of completion of the peak time interval Tp is converted into a stable form due to the surface tension, and then, switching of polarity is carried out after the remaining droplet 1b has been converted into a sufficiently stable form. Accordingly, the length of time of this switching current interval Tc is defined by the time required for the remaining droplet 1b to be converted into the stable form, and the switching current Ic is set so as to be larger than the current value for causing cut of arc, and to be smaller than the threshold current value for causing growth of droplet.

FIG. 8 is a block diagram showing a configuration of a welding power source apparatus according to the first preferred embodiment, which is provided for implement of the above-mentioned method for controlling AC pulse arc welding. In FIG. 8, the same components shown in FIG. 2 are designated by the same references, and the description thereof is omitted. In the following, the switching current interval timer circuit TC, the negative electrode time interval timer circuit TEN, the switching current setting circuit IC, the peak time interval switching circuit SP, and the switching current interval switching circuit SC, which are shown with dotted lines in a manner different from that of FIG. 2, will be described with reference to FIG. 8.

The switching current interval timer circuit TC generates and outputs the switching current interval signal STc having the high level indicating the switching current interval Tc, where output of the switching current interval signal STc is started when it is triggered upon completion of output of the peak time interval signal STp described above with reference in FIG. 2, namely, when the peak time interval signal STp changes from the high level to the low level. The negative electrode time interval timer circuit TEN generates and outputs the negative electrode time interval signal STen having the high level indicating the negative electrode time interval Ten, where output of the negative electrode time interval signal STen is started when it is triggered upon completion of output of the switching current interval signal STc, namely, when the switching current interval signal STc changes from the high level to the low level. The switching current setting circuit IC generates and outputs the switching current setting signal SIc indicating the predetermined switching current Ic.

The peak time interval switch circuit SP is switched to the contact "a" thereof when the peak time interval signal STp having the high level as described above with reference to FIG. 2 is inputted, and then, outputs the peak current setting signal SIp as described above with reference to FIG. 2 as the current control setting signal Isc. On the other hand, when the peak time interval signal STp having the low level is inputted, the peak time interval switch circuit SP is switched to the contact "b" thereof, and then, outputs a second switch setting signal Sc as the current control setting signal Isc. Further, the switching current interval switching circuit SC is switched to a contact "a" thereof when the switching current interval signal STc having the high level is inputted, and then, outputs the switching current setting signal SIc as the second switching setting signal Sc. On the other hand, when the switching current interval signal STc having the low level is inputted, the switching current interval switching circuit SC is switched to a contact "b" thereof, and then, outputs the switching current setting signal Se described above with reference to FIG. 2 as the second switching setting signal Sc.

As shown in FIG. 8, the current control setting circuit ISC according to the first preferred embodiment of the present invention is constituted by the peak time interval switching circuit SP, the switching current interval switching circuit SC and the negative electrode time interval switching circuit SE, and the processing thereof is as follows. Namely, the current control setting circuit ISC outputs the peak current setting signal SIp as the current control setting signal Isc when the peak time interval signal STp having the high level is inputted, outputs the switching current setting signal SIc as the current control setting signal Isc when the switching current interval signal STc having the high level is inputted, outputs the negative electrode current setting signal SIen as the current control setting signal Isc when the negative electrode time interval signal STen having the high level is inputted, and outputs the base current setting signal SIb as the current control setting signal Isc when none of the above three interval signals Tp, Tc and Ten are inputted, or the above three interval signals Tp, Tc and Ten each having the low level are inputted.

Figure 3:
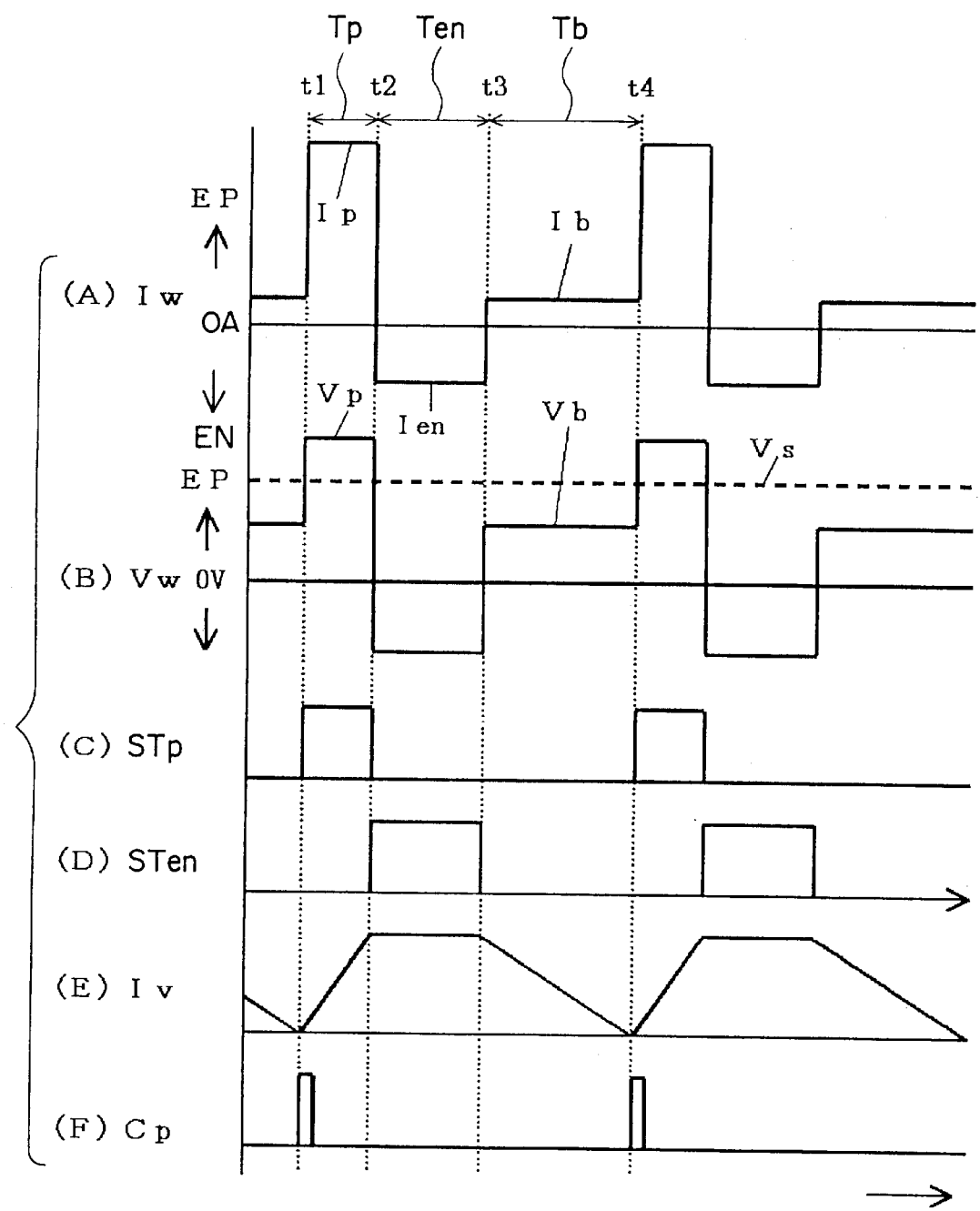
Figure 9:
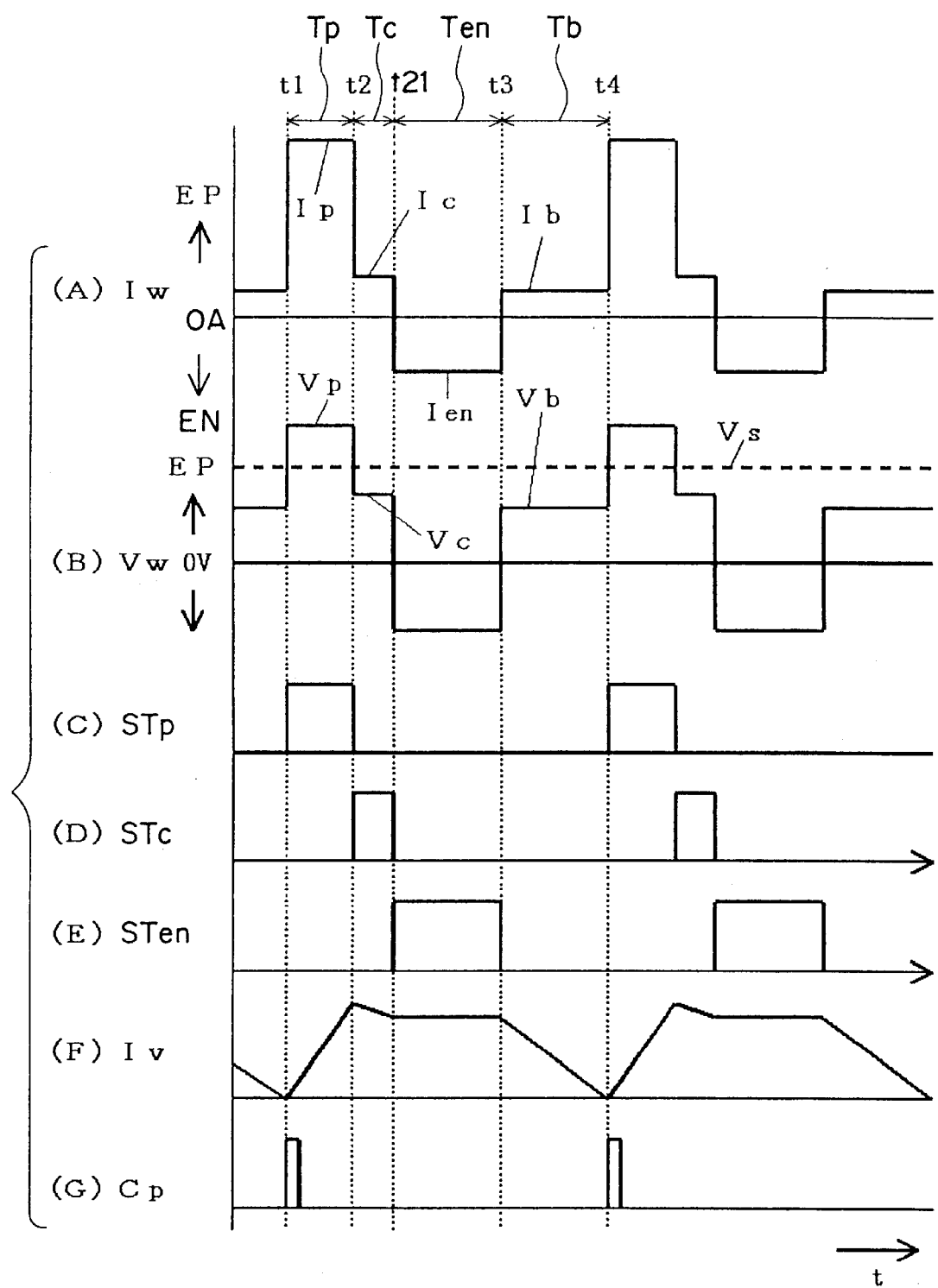

FIG. 9 is a timing chart of each signal generated in the welding power source apparatus according to the first preferred embodiment, wherein FIG. 9(A) shows a welding current Iw, FIG. 9(B) shows a welding voltage Vw, FIG. 9(C) shows a peak time interval signal STp, FIG. 9(D) shows a switching current interval signal STc, FIG. 9(E) shows a negative electrode time interval signal STen, FIG. 9(F) shows an integral value signal Iv, and FIG. 9(G) shows a reset signal Cp. In FIG. 9, the operations other than those during the time interval t2 to timing t2*l* are the same as those described with reference to FIG. 3, and therefore, the description thereof are omitted, and the operations during timing t2 to timing t2*l*, which are different from those in FIG. 3, will be described hereinafter with reference to FIG. 9.

For the switching current interval Tc from timing t2 to timing t2*l*, the negative electrode time interval signal STen having the low level shown in FIG. 9(E) is outputted so that the positive electrode polarity is set. In addition, when the switching current interval signal STc having the high level, which is shown in FIG. 9(D), is outputted when it is triggered upon completion of output of the peak time interval signal STp shown in FIG. 9(C), the switching current Ic is made to flow as shown in FIG. 9(A). Furthermore, the integral value of: Iv2=∫(Vc−Vs) dt calculated based on the switching voltage Vc and the voltage setting signal Vs which are shown in FIG. 9(B) according to the second term of the equation (2) is added to the integral value signal Iv shown in FIG. 9(F). In this case, since the switching current Ic has a small value as described above, the value of the switching voltage Vc corresponding to the switching current Ic becomes smaller than Vs, so that the value thereof gradually becomes smaller as the time elapses. Accordingly, the length of time of the base time interval Tb becomes shorter than that in FIG. 3 by the length of time corresponding to the decreasing value when the integral value signal Iv decreases during this time interval.

Second Preferred Embodiment

A second preferred embodiment of the present invention is characterized in that, in the fourth process during the switching current interval Tc, either one of the switching current Ic, the time of the switching current interval Tc, and both of the switching current Ic and the time of the switching current interval Tc is changed in accordance with the feeding speed setting signal Ws.

Figure 10:
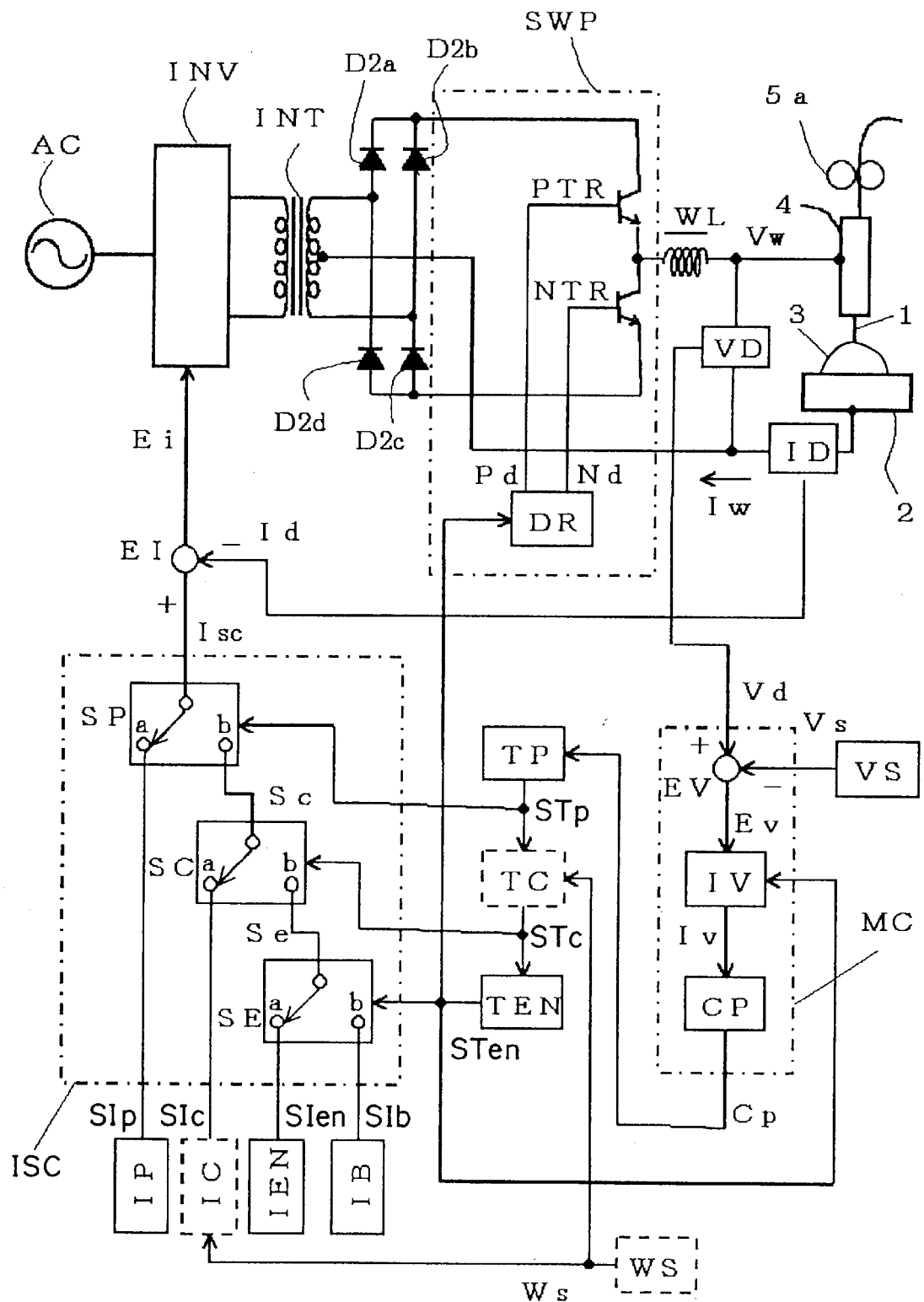
FIG. 10 is a block diagram showing a configuration of a welding power source apparatus according to a second preferred embodiment of the present invention.

FIG. 10 is a block diagram showing a configuration of a welding power source apparatus according to the second preferred embodiment of the present invention. In FIG. 10, the same components as those shown in FIG. 8 are designated by the same numeral references, and the description thereof is omitted. The feeding speed setting circuit WS, the switching current interval timer circuit TC and the switching current setting circuit IC, shown with dotted lines in a manner different from in FIG. 8, will be described hereinafter with reference to FIG. 10.

The feeding speed setting circuit WS generates and outputs a feeding speed setting signal Ws indicating a predetermined feeding speed. The switching current interval timer circuit TC is triggered by completion of output of the peak time interval signal STp described above with reference to FIG. 8, namely, at the timing when the peak time interval signal STp changes from the high level to the low level, and then, generates and outputs the switching current interval signal STc having the length of time which changes according to the feeding speed setting signal Ws. In this case, there is such a relationship that the larger the feeding speed setting signal Ws is, the shorter the switching current interval signal STc is. The switching current setting circuit IC generates and outputs the switching current setting signal SIc which changes according to the feeding speed setting signal Ws. In this case, there is such a relationship that the larger the feeding speed setting signal Ws is, the larger the switching current setting signal SIc is. In the above preferred embodiment, such a case that the values of both the switching current setting signal SIc and the switching current interval signal STc change according to the feeding speed setting signal Ws is illustrated, however, the present invention is not limited to this. The value of either the switching current setting signal SIc or the switching current interval signal STc may be changed according to the feeding speed setting signal Ws.

The reason why the switching current Ic is made larger and the time of the switching current interval Tc is made shorter when the feeding speed setting signal Ws becomes larger as described above is as follows. Namely, as apparent from FIG. 6, the maximum value Vmax of the average welding voltage for the time of the positive electrode polarity is obtained when the base time interval Tb=0, and therefore, $$V\max=(Ip\times Tp+Ic\times Tc)/(Tp+Tc).$$

In the above equation, the peak current Ip and the peak time interval Tp are defined so as to transfer one droplet per one pulse, where their values are almost fixed values. Accordingly, in order to increase the maximum value Vmax of the average welding voltage for the time of positive electrode polarity, the switching current Ic may be made larger or the switching current interval Tp may be made shorter. In general, when the feeding speed setting signal Ws becomes larger, the appropriate value of the average welding voltage for the time of positive electrode polarity becomes larger, and therefore, it is necessary to increase the maximum value Vmax of the average welding voltage for the time of positive electrode polarity. Accordingly, when the feeding speed setting signal Ws becomes larger, it is necessary to increase the switching current Ic and/or to shorten the switching current interval Tc in order to increase the maximum value Vmax of the average welding voltage at the time for positive electrode polarity.

In addition, it is necessary to set the above switching current Ic so as to be a small value for stopping growth of droplet which is larger than a current value at which cut of arc is caused. It is necessary to set the above switching current interval Tc so as to be a long time interval such that the remaining droplet 1*b* can be certainly converted from an unstable form to a stable form, and so as to be a time smaller than the time required for obtaining an appropriate arc length which is determined based on the average welding voltage.

Third Preferred Embodiment

A third preferred embodiment of the present invention is characterized in that, the method for controlling AC pulse arc welding, the length of time of the switching current interval Tc is ranged from 0.3 milliseconds to 3 milliseconds. The third preferred embodiment of the present invention will be described in detail hereinafter.

Figure 5:
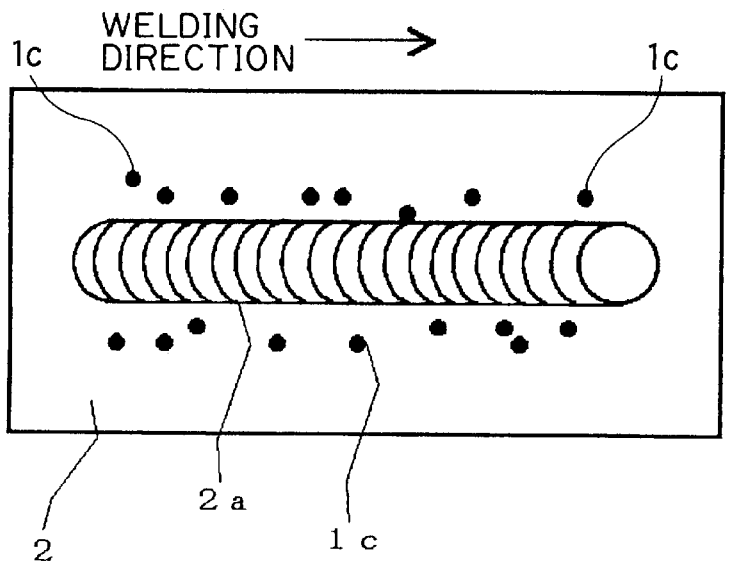
FIG. 5 is a schematic view showing an appearance of a bead in the case of welding using a method for controlling AC pulse arc welding according to the prior art which is described with reference to FIG. 1.
Figure 11:
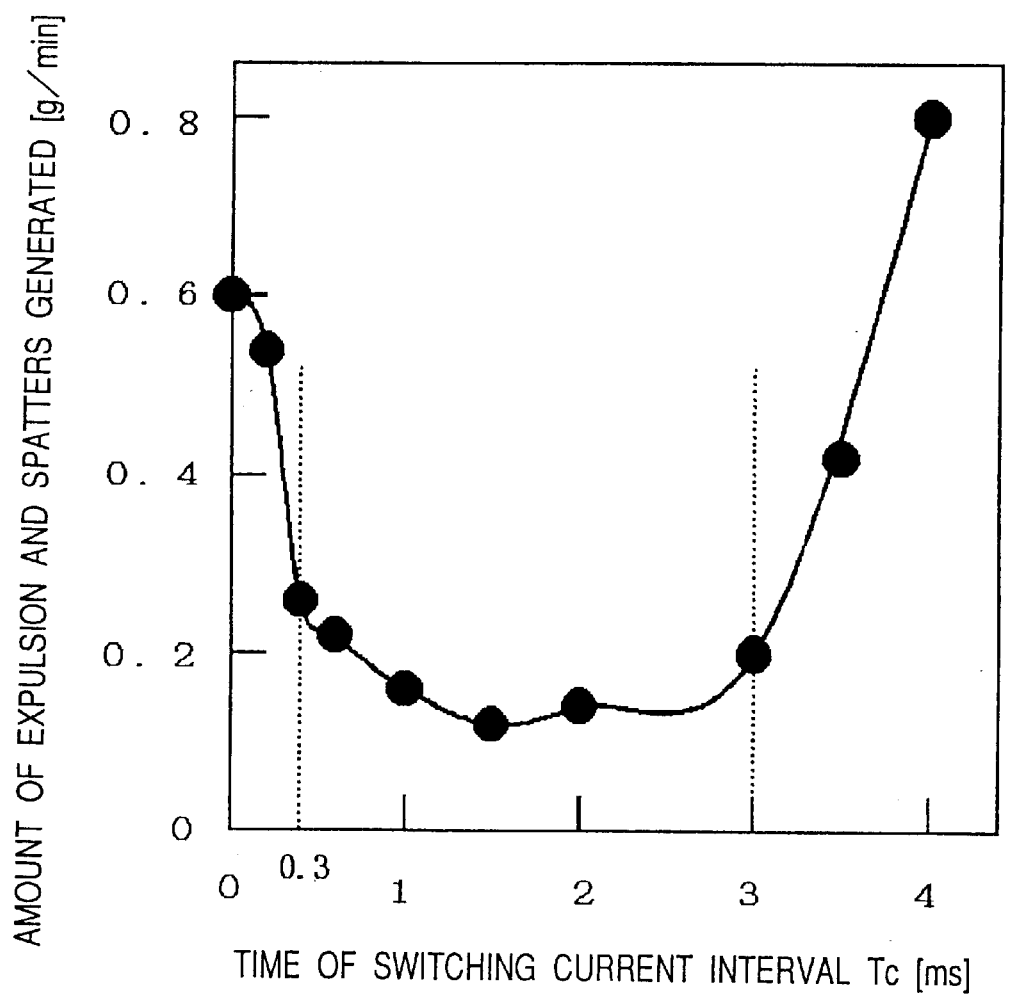
FIG. 11 is a graph showing a relationship between a time of switching current interval Tc [millisecond] and an amount of expulsion and spatters [gram/minute] generated for explanation of boundary values of the time of switching current interval Tc which are features of a third preferred embodiment of the present invention.

FIG. 11 is a graph showing a relationship between a switching current interval Tc [millisecond] and an amount of expulsion and spatters [gram/minute] generated for explanation of boundary values of the switching current interval Tc which are features of the third preferred embodiment of the present invention. In FIG. 11, the horizontal axis of the graph shows change in the switching current interval Tc while the vertical axis thereof shows the amount of expulsion and spatters generated. In FIG. 11, the amount of expulsion and spatters generated is measured when welding is carried out under the same welding conditions as those of FIG. 5.

Referring to FIG. 11, the amount of expulsion and spatters generated dramatically decreases to the lower limit boundary value of the switching current interval Tc=0.3 milliseconds, and the amount of expulsion and spatters generated gradually decreases from this lower limit boundary value to the switching current interval Tc=2 milliseconds. This is because the time required for converting the remaining droplet 1b from an unstable form to a stable form is distributed in a range approximately from 0.3 milliseconds to 3 milliseconds as described above with reference to FIG. 7.

In addition, the amount of expulsion and spatters generated increases gradually from the switching current interval Tc=2 milliseconds to the switching current interval Tc=3 milliseconds, and the switching current interval Tc=3 milliseconds is the upper limit boundary value, above which the amount of expulsion and spatters generated increases dramatically. This is because, as described above with reference to FIG. 10, when the switching current interval Tc becomes long, the maximum value Vmax of the average welding voltage for the time of positive electrode polarity becomes small, so that the average welding voltage cannot be set to an appropriate value, and as a result, spatters with grains larger than expulsion grains are generated. Accordingly, it is preferable to set the switching current interval Tc so as to be ranged from 0.3 milliseconds to 3 millisecond.

The welding power source apparatus for implementing the third preferred embodiment is the same as that shown in FIGS. 8 or 10 except for the length of time of the switching current interval Tc indicated by the switching current interval signal STc outputted from the switching current interval timer circuit TC. The switching current interval timer circuit TC according to the third preferred embodiment generates and outputs the switching current interval signal STc indicating the length of time of the switching current interval Tc which is preferably ranged from 0.3 milliseconds to 3 milliseconds.

The length of time of the switching current interval Tc is more preferably ranged from 0.5 milliseconds to 2 milliseconds, and the switching current Ic is preferably ranged approximately from 30 to 50 A. Further, the switching current Ic is more preferably ranged from a value substantially equal to the base current Ib, to about several tens A.

In the above-mentioned preferred embodiments, it is preferable to set such a relationship that the feed speed setting signal Ws is approximately in inverse proportion to the length of time of the switching current interval Tc. For example, the practical feeding speed is preferably ranged from 3 to 18 m/min. In this case, the average value of the welding current Iw is preferably ranged from 30 to 250 A. For these ranges, the length of time of switching current interval Tc may be changed so as to be ranged from 2 to 0.5 milliseconds as described above, in a manner of substantial straight line, namely, in inverse proportion to the feeding speed setting signal Ws. Alternatively, in order to set the length of time of switching current interval Tc in a simple manner, the range of the feeding speed setting signal Ws may be divided into several sections, and the length of time of switching current interval Tc may be changed in a step manner according to respective sections of the feeding speed setting signal Ws.

In the above-mentioned preferred embodiments, it is preferable to set such a relationship that the feed speed setting signal Ws is approximately in proportion to the switching current Ic. For example, the practical feeding speed is preferably ranged from 3 to 18 m/min. In this case, the average value of the welding current Iw is preferably ranged from 30 to 250 A. For these ranges, the switching current Ic may be changed so as to be ranged from 30 to 80 A as described above, in a manner of substantial straight line, namely, in proportion to the feeding speed setting signal Ws. Alternatively, in order to set the switching current Ic in a simple manner, the range of the feeding speed setting signal Ws may be divided into several sections, and the switching current Ic may be changed in a step manner according to respective sections of the feeding speed setting signal Ws.

Fourth Preferred Embodiment

A fourth preferred embodiment of the present invention is characterized in that the first process during the peak time interval Tp includes the steps of:

(a) supplying the welding current Iw which increases to the peak current Ip with time for a time interval (referred to as a peak leading time interval Tup hereinafter);

(b) supplying the welding current Iw of the constant peak current Ic for a time interval (referred to as a peak value time interval CTp hereinafter); and (c) supplying the welding current Iw which gradually decreases from the peak current Ip with time for a time interval (referred to as a peak trailing time interval Tdw hereinafter).

Figure 12:
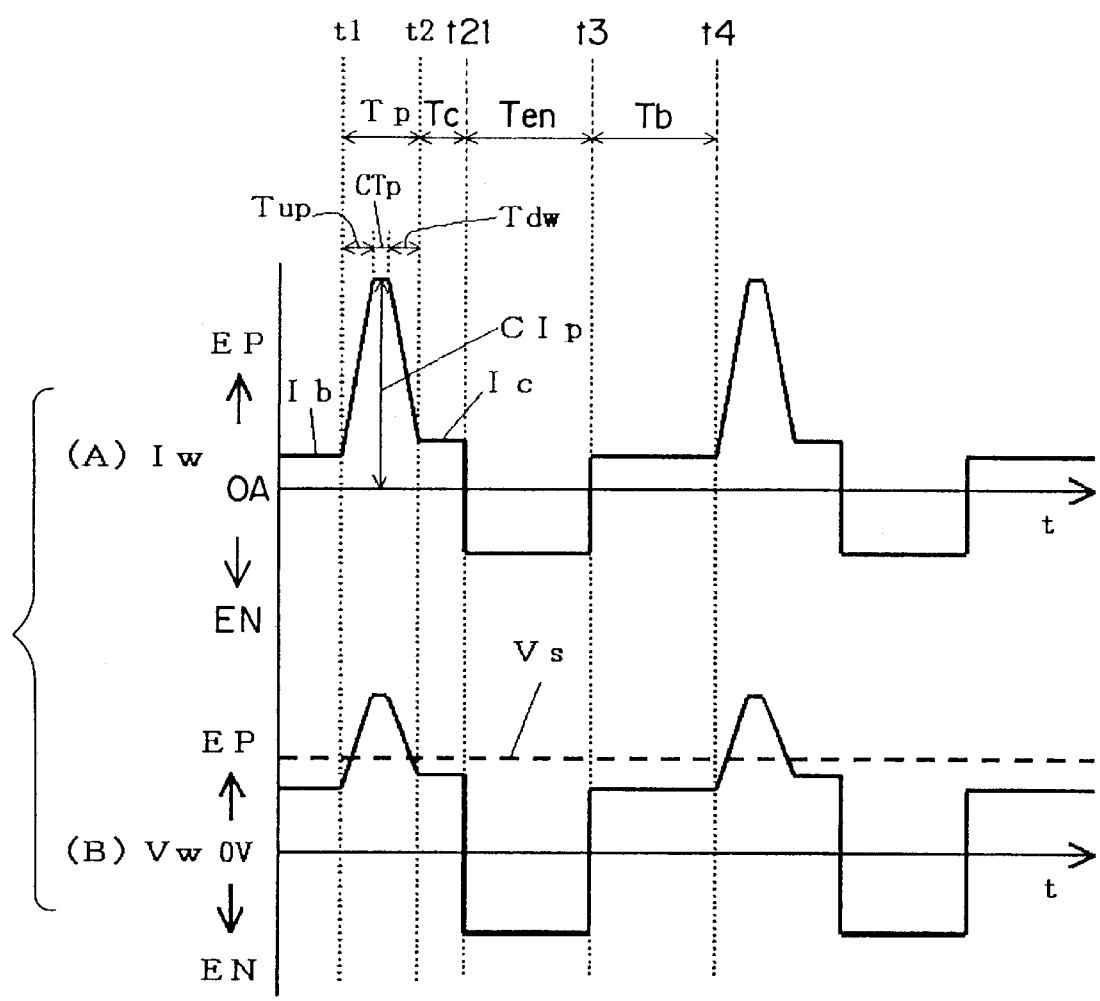

FIG. 12 is a timing chart of signals showing an operation of a method for controlling AC pulse arc welding according to the fourth preferred embodiment of the present invention, wherein FIG. 12(A) shows a welding current Iw, and FIG. 12(B) shows a welding voltage Vw. In FIG. 12, the operation for the time intervals other than the peak time interval Tp of timing t1 to timing t2 are the same as that shown in FIG. 6, and the description thereof is omitted. The operation for the peak time interval Tp will be described with reference to FIG. 12. During the peak time interval Tp of timing t1 to timing t2, a transition current which increases with a positive inclination from the base current Ib to the constant peak current CIp is made to flow during the peak leading time interval Tup that is predetermined from the starting timing of timing t1 of the peak time interval Tp, and then, the constant peak current CIp is made to flow during the constant peak time interval CTp which is defined by subtracting the peak leading time interval Tup and a predetermined peak trailing time interval Tdw from the peak time interval Tp, and then, a further transition current which decreases with a negative inclination from the constant peak current CIp to the switching current Ic is made to flow during the peak trailing time interval Tdw. The constant peak current CIp is equal to the peak current Ip of the first to third preferred embodiments.

In the fourth preferred embodiment, the peak time interval Tp includes both of the peak leading time interval Tup and the peak trailing time interval Tdw, however, the present invention is not limited to this. The peak time interval Tp may includes either one of the peak leading time interval Tup and the peak trailing time interval Tdw.

The reason why the peak time interval Tp further includes the peak leading time interval Tup and the peak trailing time interval Tdw as described above is as follows. Namely, if the peak leading time interval Tup is not provided, because of rapid rising of the welding current Iw from the base current Ib of a small current value of approximately several tens A to the peak current Ip of a large current value of approximately several hundreds A at the starting timing of the peak time interval Tp, the arc force which acts on the molten pool changes suddenly or abruptly so that an irregular oscillation occurs in the molten pool, and this sometimes leads to deterioration in the appearance of the bead. On the other hand, if the peak leading time interval Tup is provided, as described above, by making a transition current flow which increases from the starting timing of the peak time interval Tp with an positive inclination, the change in the arc force decreases so that no irregular oscillation of the molten pool occurs. Therefore, an excellent appearance of the bead is obtained. The reason why the peak trailing time interval Tdw is provided is the same as that as described above.

The welding power source apparatus for implementing the method for controlling AC pulse arc welding according to the fourth preferred embodiment has a configuration which is obtained by replacing the peak current setting circuit IP of FIGS. 8 and 10 with the peak current generating circuit IPC.

Figure 13:
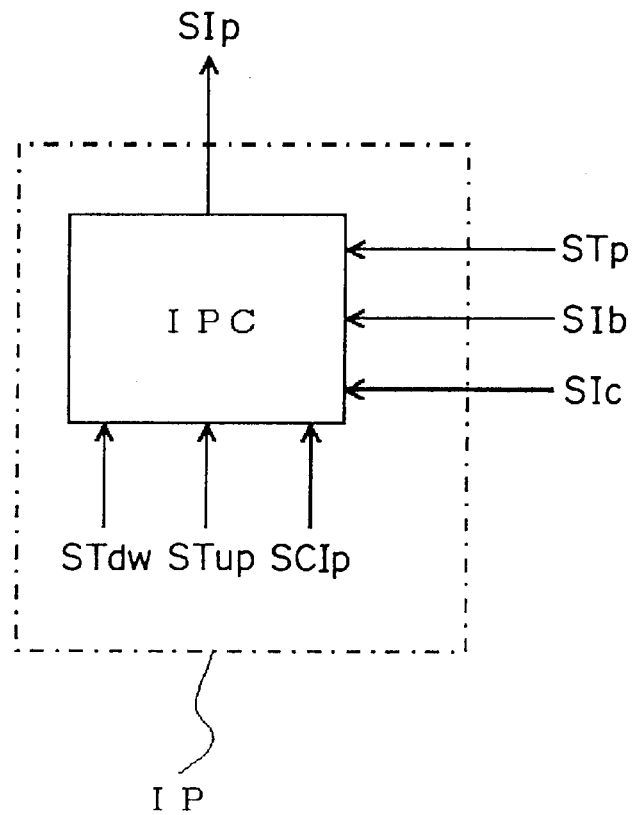
FIG. 13 is a block diagram showing a configuration of a peak current generating circuit IPC according to the fourth preferred embodiment.

FIG. 13 is a block diagram showing a configuration of a peak current generating circuit IPC according to the fourth preferred embodiment.

The peak time interval signal STp, the base current setting signal SIb and the switching current setting signal SIc described above with reference to FIGS. 8 and 10 are inputted to the peak current generating circuit IPC, which generates and outputs the peak current setting signal SIp increasing the same signal SIp with a positive inclination from the base current setting signal SIb to the constant peak current CIp for the peak leading time interval Tup from the timing when the peak time interval signal STp having the high level is inputted, and then, which generates and outputs the peak current setting signal SIp having the constant peak current CIp for the constant peak time, interval CTp which is defined by subtracting the peak leading time interval Tup and the peak trailing time interval Tdw from the peak time interval signal STp, thereafter, which generates and outputs the peak current setting signal SIp decreasing the same signal SIp with a negative inclination from the constant peak current CIp to the switching current setting signal SIc as described above in FIGS. 8 and 10 for the above peak trailing time interval Tdw.

Modified Preferred Embodiments

Figure 15:
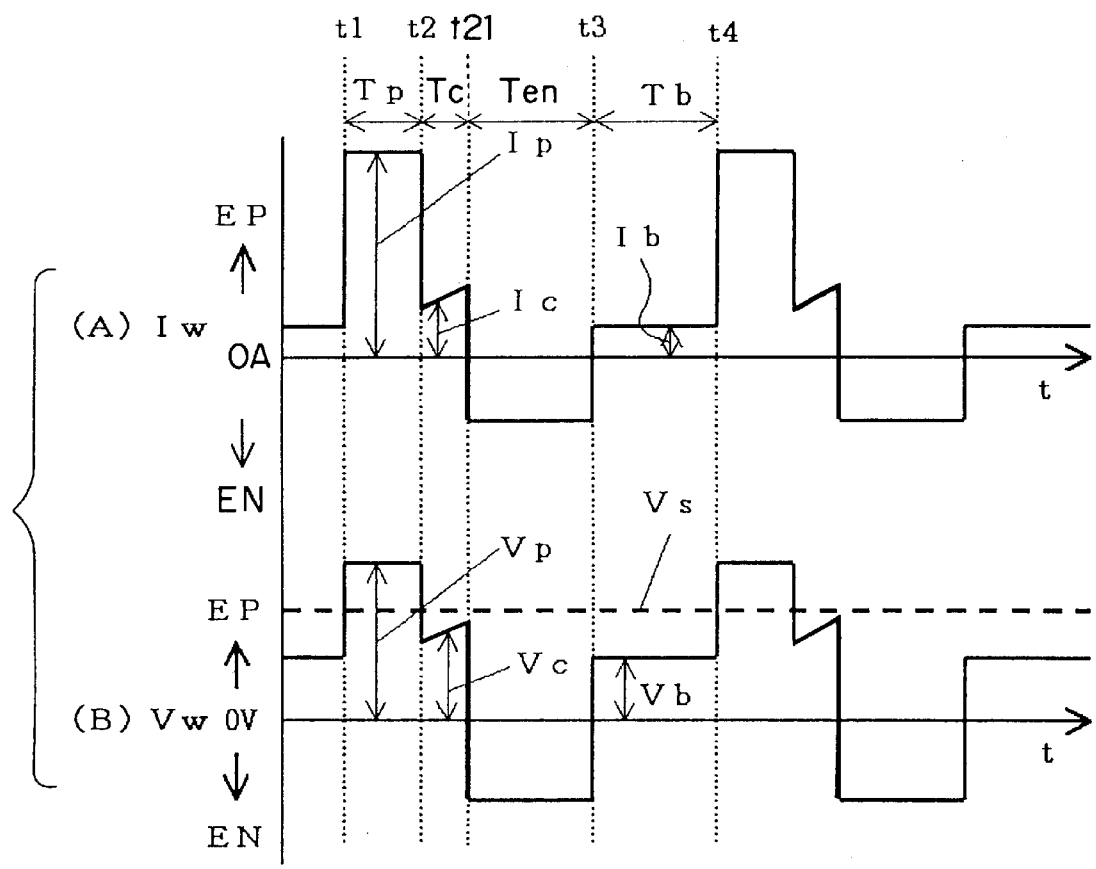

FIG. 15 is a timing chart of signals showing an operation of a method for controlling AC pulse arc welding according to a modified first preferred embodiment of the present invention, wherein FIG. 15(A) shows a welding current Iw, and FIG. 15(B) shows a welding voltage Vw.

The modified first preferred embodiment is a modification of the first preferred embodiment shown in FIG. 6. Referring to FIG. 15, the switching current Ic for the switching current interval Tc may be gradually increased with a positive inclination as the time elapses so that the switching current Ic is smaller than the threshold current for droplet transfer.

Figure 16:
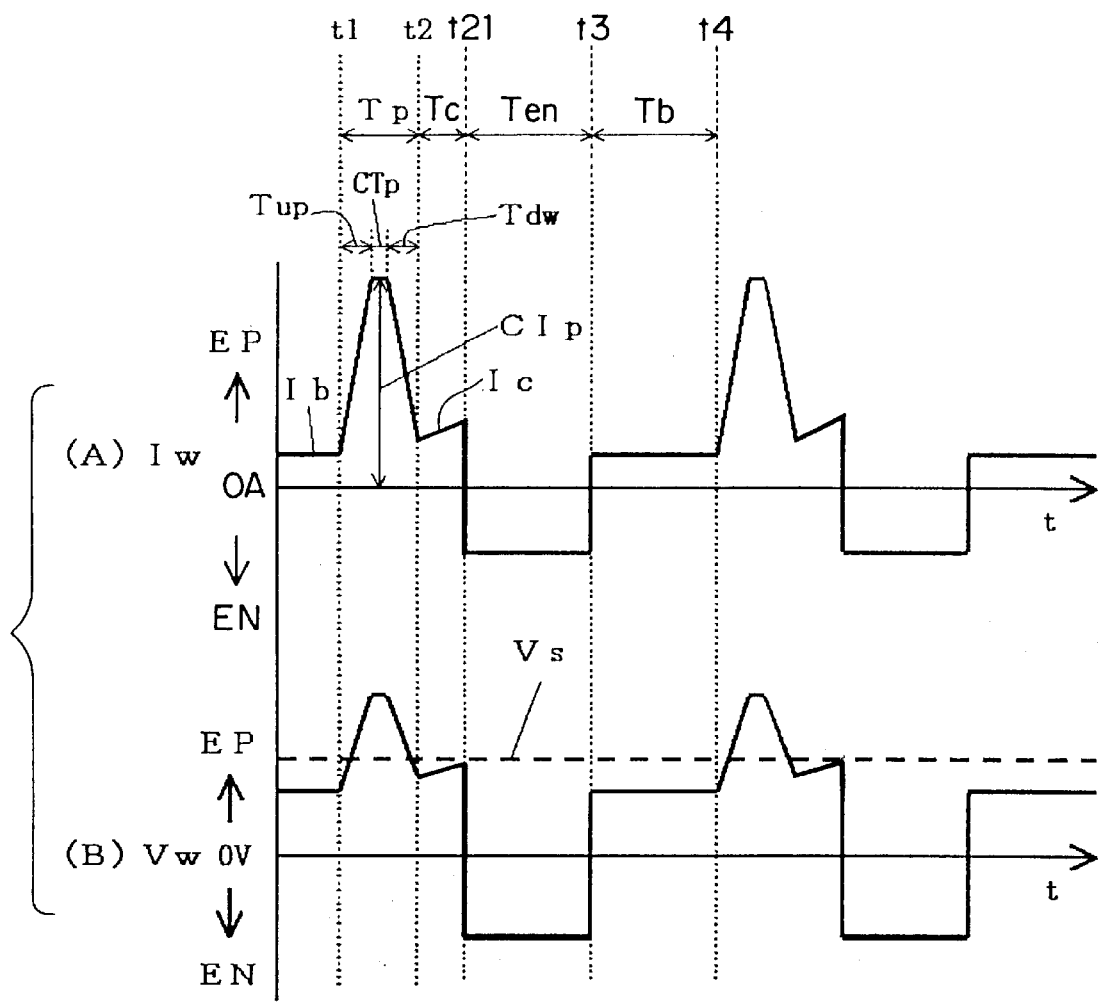

FIG. 16 is a timing chart of signals showing an operation of a method for controlling AC pulse arc welding according to a modified fourth preferred embodiment of the present invention, wherein FIG. 16(A) shows a welding current Iw, and FIG. 16(B) shows a welding voltage Vw.

The modified fourth preferred embodiment is a modification of the fourth preferred embodiment shown in FIG. 12. Referring to FIG. 16, the switching current Ic for the switching current interval Tc may be gradually increased with a positive inclination as the time elapses so that the switching current Ic is smaller than the threshold current for droplet transfer.

Advantageous Effects of Preferred Embodiments

Figure 14:
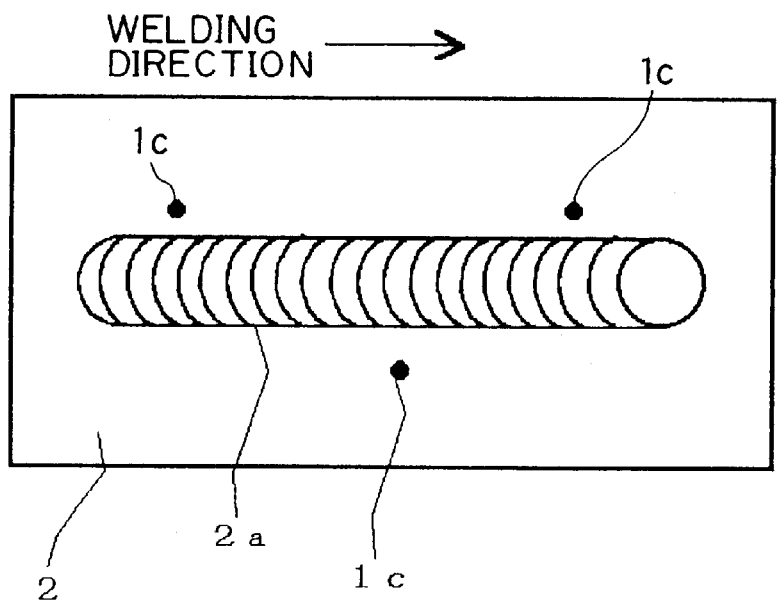
FIG. 14 is a schematic view showing an appearance of a bead in the case of welding using a method for controlling AC pulse arc welding according to the first to fourth preferred embodiments of the present invention.

FIG. 14 is a schematic view showing advantageous effects in an appearance of a bead in the case of welding using the method for controlling AC pulse arc welding according to the first to fourth preferred embodiments of the present invention. FIG. 14 corresponds to FIG. 5 of the prior art, and the welding conditions thereof are the same as those in FIG. 5 except for newly added conditions of a switching current Ic=80 A and a length of time of switching current interval Tc=1 millisecond. As shown in FIG. 14, almost no expulsion 1c is generated into the periphery of the welding bead 2a formed in the object 2 to be welded, and then, an excellent appearance of the bead can be obtained.

According to the method and the apparatus for controlling AC pulse arc welding of the preferred embodiments of the present invention, by providing the switching current interval Tc for making the switching current Ic flow between the peak time interval Tp and the negative electrode time interval Ten, the electrode polarity is switched after the remaining droplet immediately after droplet transfer is converted from an unstable form to a stable form, and therefore, the amount of expulsion and spatters generated from the remaining droplet is reduced to a great extent. As a result, an excellent appearance of the bead can be obtained.

In addition, according to a further preferred embodiment of the present invention, by setting the switching current Ic and the switching current interval Tc to appropriate values respectively in accordance with the feeding speed, the maximum value Vmax of the possible average welding voltage for the time of the positive electrode polarity can be increased, in addition to the above obtained advantageous effects. Therefore, it can be prevented from unstable operation of the welding conditions such as a large amount of expulsions and spatter generated due to such a fact that an appropriate average welding voltage value cannot be outputted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for controlling AC pulse arc welding executed by supplying a welding current flowing between a welding wire and an object to be welded with feeding the welding wire at a feeding speed corresponding to a predetermined feeding speed setting signal, said method including a step of repeatedly executing a one-period process for supplying the welding current, said one-period process including:

(a) a first process during a peak time interval for supplying a welding current having a peak current for droplet transfer, which is larger than a predetermined threshold current and which flows from the welding wire to the object to be welded with a positive electrode polarity;

(b) a second process during a negative electrode time interval for thereafter supplying a welding current having a negative electrode current for stopping droplet transfer which flows from the object to be welded to the welding wire with a negative electrode polarity; and (c) a third process during base time interval for thereafter supplying a welding current having a base current for stopping droplet transfer which is smaller than the threshold current with a positive electrode polarity, (d) wherein said one-period process further includes a fourth process during a predetermined switching current interval, inserted between the peak time interval and the negative electrode time interval independently of the peak time interval and the negative electrode time interval, said switching current interval being a time interval of droplet transfer from an unstable shape of droplet to a stable shape thereof, said switching current interval having a time interval smaller than a further time interval for which spatters are dramatically generated by limitation of an average welding voltage, said fourth process supplying a welding current having a switching current for stopping growth of droplet which is smaller than the threshold current with a positive electrode polarity.

2. The method as claimed in claim 1, wherein, in the fourth process during the switching current interval, either one of the switching current, a time of the switching current interval, and both of the switching current and the time of the switching current interval is changed in accordance with the feeding speed setting signal.

3. The method as claimed in claim 1, wherein the time of switching current interval is set so as to be fallen in a range from 0.3 milliseconds to 3 milliseconds.

4. The method as claimed in claim 1, wherein the first process during the peak time interval further includes a step of supplying the welding current which increases to the peak current with time.

5. The method as claimed in claim 1, wherein the first process during the peak time interval further includes a step of supplying the welding current which decreases from the peak current with time.

6. The method as claimed in claim 1, wherein the first process during the peak time interval further includes the steps of:
(a) supplying the welding current which increases to the peak current with time; and
(b) supplying the welding current which decreases from the peak current with time.

7. The method as claimed in claim 1, wherein the fourth process during the switching current interval further includes a step of increasing the switching current with time.

8. An apparatus for controlling AC pulse arch welding executed by supplying a welding current flowing between a welding wire and an object to be welded with feeding the welding wire at a feeding speed corresponding to a predetermined feeding speed setting signal, said apparatus comprising controller means for repeatedly executing a one-period process for supplying the welding current, said one-period process including:

(a) a first process during a peak time interval for supplying a welding current having a peak current for droplet transfer, which is larger than a predetermined threshold current and which flows from the welding wire to the object to be welded with a positive electrode polarity;

(b) a second process during a negative electrode time interval for thereafter supplying a welding current having a negative electrode current for stopping droplet transfer which flows from the object to be welded to the welding wire with a negative electrode polarity; and (c) a third process during a base time interval for thereafter supplying a welding current having a base current for stopping droplet transfer which is smaller than the threshold current with a positive electrode polarity, wherein said one-period process further includes a fourth process during a predetermined switching current interval, inserted between the peak time interval and the negative electrode time interval independently of the peak time interval and the negative electrode time interval, said switching current interval being a time interval of droplet transfer from an unstable shape of droplet to a stable shape thereof, said switching current interval having a time interval smaller than a further time interval for which spatters are dramatically generated by limitation of an average welding voltage, said fourth process supplying a welding current having a switching current for stopping growth of droplet which is smaller than the threshold current with a positive electrode polarity.

9. The apparatus as claimed in claim 8, wherein, in the fourth process during the switching current interval, either one of the switching current, a time of the switching current interval, and both of the switching current and the time of the switching current interval is changed in accordance with the feeding speed setting signal.

10. The apparatus as claimed in claim 8, wherein the time of switching current interval is set so as to be fallen in a range from 0.3 milliseconds to 3 milliseconds.

11. The apparatus as claimed in claim 8, wherein the first process during the peak time interval further includes a step of supplying the welding current which increases to the peak current with time.

12. The apparatus as claimed in claim 8, wherein the first process during the peak time interval further includes a step of supplying the welding current which decreases from the peak current with time.

13. The apparatus as claimed in claim 8, wherein the first process during the peak time interval further includes the steps of:
(a) supplying the welding current which increases to the peak current with time; and
(b) supplying the welding current which gradually decreases from the peak current with time.

14. The method as claimed in claim 8, wherein the fourth process during the switching current interval further includes a step of increasing the switching current with time.

15. An AC pulse arc welding power source apparatus for use in executing AC pulse arc welding by supplying a welding current flowing between a welding wire and an object to be welded with feeding the welding wire at a feeding speed corresponding to a predetermined feeding speed setting signal, said apparatus comprising:

a peak time interval timer circuit for generating and outputting a peak time interval signal indicating a predetermined peak time interval;

a switching current interval timer circuit for generating and outputting a switching current interval signal indicating a predetermined switching current interval in response to output completion of the peak time interval signal;

a negative electrode time interval timer circuit for generating and outputting a negative electrode time interval signal indicating a negative electrode time interval in response to output completion of the switching current interval signal;

a voltage detection circuit for detecting an AC welding voltage applied between the welding wire and the object to be welded, and for generating and outputting a voltage detection signal indicating a detected AC welding voltage;

a voltage setting circuit for generating and outputting a voltage setting signal indicating a predetermined set voltage;

a modulation circuit for calculating an integral value of an error between the voltage setting signal and the voltage detection signal when the AC welding voltage is larger than zero from a start timing of output of the peak time interval signal, and for generating and outputting a reset signal for triggering restart of output of said peak time interval timer circuit when a calculated integral value becomes zero;

a peak current setting circuit for generating and outputting a peak current setting signal indicating a predetermined peak current for droplet transfer;

a switching current setting circuit for generating and outputting a switching current setting signal indicating a predetermined switching current for stopping growth of droplet;

a negative electrode current setting circuit for generating and outputting a negative electrode current setting signal indicating a predetermined negative electrode current for stopping droplet transfer;

a base current setting circuit for generating and outputting a base current setting signal indicating a predetermined base current for stopping droplet transfer;

a current control setting circuit for outputting the peak current setting signal as the current control setting signal when the peak time interval signal is inputted, for outputting the switching current setting signal as the current control setting signal when the switching current interval signal is inputted, for outputting the negative electrode current setting signal as the current control setting signal when the negative electrode time interval signal is inputted, and for outputting the base current setting signal as the current control setting signal when none of the three interval signals is inputted;

a polarity switching circuit for switching a DC output from said power source apparatus so as to have a negative electrode polarity when the negative electrode time interval signal is inputted, and for switching the DC output from said power source apparatus so as to have a positive electrode polarity when no signal is inputted;

a current detection circuit for detecting a AC welding current, for calculating an absolute value of a detected AC welding current, and for generating and outputting a current detection signal indicating a calculated absolute value thereof; and an output control circuit for controlling the welding current so that the current control setting signal and the current detection signal become equal to each other.

16. The apparatus as claimed in claim 15, wherein said switching current setting circuit changes the switching current of the switching current setting signal in accordance with the feeding speed setting signal, and wherein said switching current interval timer circuit changes a time of the switching current interval of the switching current interval signal in accordance with the feeding speed setting signal.

17. The apparatus as claimed in claim 15, wherein said switching current interval timer circuit outputs the switching current interval signal having a time of the switching current interval which is ranged from 0.3 milliseconds to 3 milliseconds.

18. The apparatus as claimed in claim 15, wherein the peak current setting circuit generates and outputs the peak current setting signal with changing the peak current setting signal so as to supply the welding current which increases from the base current to the peak current with time for a first time interval, to thereafter supply the welding current having the peak current for a second time interval, and to thereafter supply the welding current which decreases from the peak current to the base current with time for a third time interval.

19. The apparatus as claimed in claim 15, wherein said switching current setting circuit increases the switching current of the switching current setting signal with time.

* * * * *